(12) United States Patent  
Yagyu et al.

(10) Patent No.: US 6,399,947 B2
(45) Date of Patent: Jun. 4, 2002

(54) INFRARED RAY RECEIVING ELEMENT AND INFRARED RAY SENSOR USING THE SAME

(75) Inventors: Hiroyuki Yagyu, Hirakata; Tomoaki Matsushima, Kizu-cho; Motoo Ikari; Yuji Takada, both of Kyoto; Ryo Taniguchi, Nara; Makoto Nishimura, Toyonaka; Nobuyuki Miyagawa, Takatsuki; Masato Kawashima, Osaka, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 1 day.

(21) Appl. No.: 09/734,397

(22) Filed: Dec. 11, 2000

(30) Foreign Application Priority Data

Dec. 17, 1999 (JP) .......................................... 11-360043

(51) Int. Cl.[7] .............................. G01J 1/02; G01J 5/10
(52) U.S. Cl. ................................. 250/338.3; 250/338.1
(58) Field of Search .......................... 250/338.3, 338.1, 250/336.1, 342, 349, 332, 340

(56) References Cited

U.S. PATENT DOCUMENTS 4,441,023 A * 4/1984 Doctor et al. ............... 250/338
4,691,104 A    9/1987 Murata et al.

FOREIGN PATENT DOCUMENTS

| JP | 61-002025 | 1/1986 |
| JP | 61-116628 | 6/1986 |
| JP | 64-61618  | 3/1989 |
| JP | 1-124530  | 8/1989 |
| JP | 10-300570 | 11/1998 |

* cited by examiner

Primary Examiner—Constantine Hannaher
Assistant Examiner—Otilia Gabor
(74) Attorney, Agent, or Firm—Jordan and Hamburg LLP

(57) ABSTRACT

An infrared ray receiving element includes a substrate made of a pyroelectric material and having at least one cantilever portion surrounded by a slit, in which at least a part of the cantilever portion in the substrate is uniformly polarized in the same direction and the remainder in the substrate includes a portion polarized at random. At least a pair of electrodes are respectively provided on a top surface and a bottom surface of the cantilever portion.

18 Claims, 24 Drawing Sheets

INFRARED RAY RECEIVING ELEMENT AND INFRARED RAY SENSOR USING THE SAME

BACKGROUND OF THE INVENTION

1. Field of the Invention

This invention relates to a pyroelectric-type infrared ray receiving element for receiving infrared rays (hereinafter abbreviated as "IR") radiated from an object, and an IR sensor using the IR ray receiving element.

2. Description of the Related Art

A pyroelectric-type IR receiving element is conventionally used to a sensor for sensing heat, temperature, approach of human, or the like. A configuration of the conventional pyroelectric-type IR receiving sensor is shown in FIG. 36.

As can be seen from FIG. 36, two pairs of electrodes 2A and 2B, and 2C and 2D are formed on top and bottom surfaces 1A and 1B of a substrate 1 for facing each other. Both sides of the substrate 1 are fixed to stands 3A and 3B formed on a base member 3 by conductive adhesives 4A and 4B.

The substrate 1 is made of a ferroelectric material such as a ceramics of $PbTiO_3$ or $Pb(Ti+Zr)O_3$, a single crystal of $LiTaO_3$, or a high molecular compound of $PVF_2$. Arrow P designates a direction having the largest pyroelectric coefficient in the material of the substrate 1. In the following description, the direction designated by arrow P will be called "polarization direction".

The electrodes 2A to 2D are made of an IR absorbent material such as NiCr or the like. The electrodes 2A to 2D are formed by vapor deposition, sputtering or screen printing. The electrodes 2A and 2C on the top surface 1A of the substrate 1 respectively serve as IR sensing portions. The electrodes 2A to 2D respectively have the same rectangular shape. The electrodes 2A to 2D are connected to an external circuit by wires or conductive patterns which are not shown in the figure. Two sets of the electrodes 2A and 2B, and 2C and 2D respectively configure capacitors. An equivalent circuit of the conventional IR receiving element is shown in FIG. 37.

When IR reach to the surfaces of the electrodes 2A and 2C, energy of the IR is converted to thermal energy, and temperature at surfaces of the electrodes 2A and 2C increases. When the temperature of the substrate 1 is varied, pyroelectric charges occur in the substrate 1 owing to variation of spontaneous polarization of the pyroelectric material. The occurrence of the pyroelectric charges in the substrate 1 can be sensed by variation of voltage signals through a resistor R and a field-effect transistor FET in the equivalent circuit shown in FIG. 37. As a result, incidence of the IR into the IR receiving element can be sensed.

When ambient temperature of the substrate 1 is varied, the substrate 1 will be warped as shown in FIG. 38 due to a difference of thermal coefficients between the substrate 1 and the base member 3. The warp of the substrate 1 causes the occurrence of undesired electric charges, since the pyroelectric material of the substrate 1 shows piezoelectric effect, too. When the electric charges locally charged due to the piezoelectric effect of the substrate 1 are discharged, the discharge will be observed as unexpected noise signal called "popcorn noise".

For reducing the occurrence of the popcorn noise, the inventors have proposed to configure the IR receiving portions as the cantilever fashion described in the publication gazette of Japanese Patent Application Hei 10-2793. Concretely, U-shaped slits are formed in the substrate 1 for surrounding three sides of the electrodes 2A to 2D. By such the configuration, the IR receiving portions are substantially formed on the cantilevers, so that no stress occurs in the IR receiving portion, even when the substrate 1 is partially warped. As a result, the occurrence of the popcorn noise can be reduced.

It, however, is difficult to prevent the occurrence of the popcorn noise completely only by the above-mentioned U-shaped slits. The conventional substrate 1 is formed by a material uniformly polarized as shown in FIG. 4, where the polarization direction in any portion is the same. When the substrate 1 is partially warped due to the difference of the thermal expansion coefficients between the substrate 1 and the base member 3 except the IR receiving portions formed in the cantilever fashion, the undesired electric charges occur due to the piezoelectric effect in the warped portion where no conductive pattern is formed. These undesired electric charges generally disappear by coupling with ions which flow in the circumference of the substrate 1. The undesired electric charges, however, sometimes discharge to neighboring conductive patterns, circuit substrate, or metal housing, so that the popcorn noise is rarely observed.

The inventors have carefully experimented and considered the cause of the occurrence of the popcorn noises, and found that piezoelectric effect of the material of the substrate 1 acts as a trigger instantaneously for discharging the undesired electric charges when the stress due to the difference of the thermal expansion coefficients between the substrate 1 and the base member 3 of the adhesive 4A, 4B is applied to the substrate 1 or when external mechanical vibrations are applied to the substrate 1.

SUMMERY OF THE INVENTION

An object of this invention is to provide an IR receiving element in which the popcorn noise hardly occurs, and to provide an IR sensor using the same.

An infrared ray receiving element in accordance with this invention comprises: a substrate made of a pyroelectric material and having at least one cantilever portion surrounded by a slit, in which at least a part of the cantilever portion in the substrate is uniformly polarized in the same direction and the remainder in the substrate includes a portion polarized at random; and at least a pair of electrodes respectively provided on a top surface and a bottom surface of the cantilever portion.

An infrared ray sensor in accordance with this invention comprises an infrared ray receiving element, a base member for holding the infrared ray receiving element, a circuit substrate connected to the infrared ray receiving element for detecting that infrared ray reached to an infrared ray receiving portion of the infrared ray receiving element, a chassis for supporting the infrared ray receiving element, the base member, the circuit substrate, and a cover with an infrared ray transmittable window, wherein the substrate is made of a pyroelectric material and has at least one cantilever portion surrounded by a slit, in which at least a part of the cantilever portion in the substrate is uniformly polarized in the same direction and the remainder in the substrate includes a portion polarized at random; and at least a pair of electrodes are respectively provided on a top surface and a bottom surface of the cantilever portion.

By the above-mentioned configurations, the IR receiving portion is formed on the cantilever portion, so that the IR receiving portion is hardly warped even when the ambient temperature of the substrate is varied. Thus, no electric charge due to the piezoelectric effect of the substrate made of the pyroelectric material is generated in the IR receiving portion. Furthermore, most of the substrate except the IR receiving portion is polarized at random, so that electric charges generated in each minute portion in the substrate by the piezoelectric effect when the substrate is partially warped will be canceled by the random direction of the polarization. Thus, the undesired electric charge is hardly charged in the substrate, and the discharge of the undesired electric charge hardly occurs even when stress due to the difference of the thermal expansion coefficients between the substrate and a base member or an adhesive for supporting the substrate is applied to the substrate or when external mechanical vibrations are applied to the substrate. As a result, popcorn noise is hardly observed.

DETAILED DESCRIPTION OF THE EMBODIMENT

First Embodiment

Figure 1:
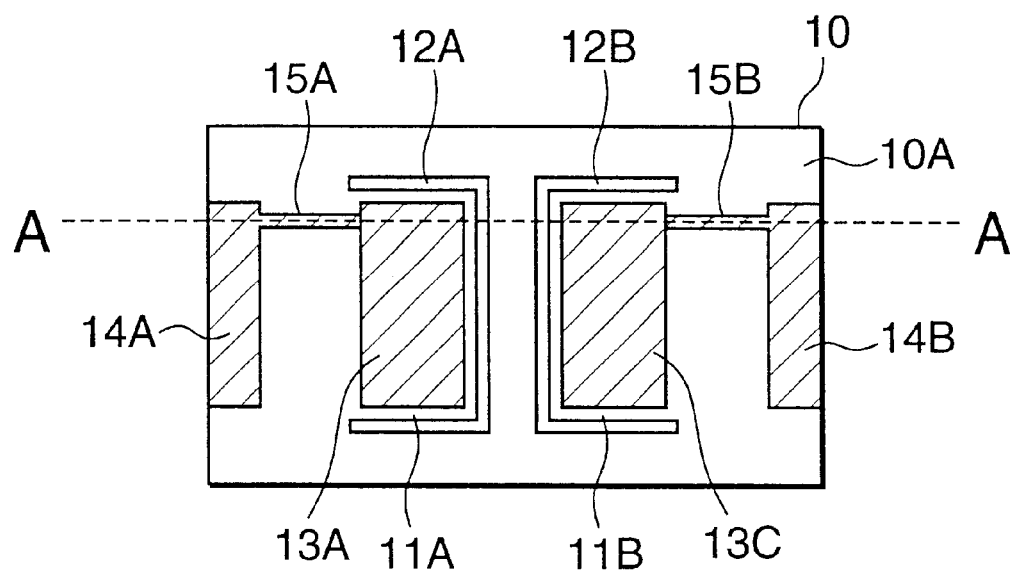
FIG. 1 is a plan view for showing a configuration on a top surface of a substrate of a pyroelectric-type IR receiving element in a first embodiment of this invention.
Figure 2:
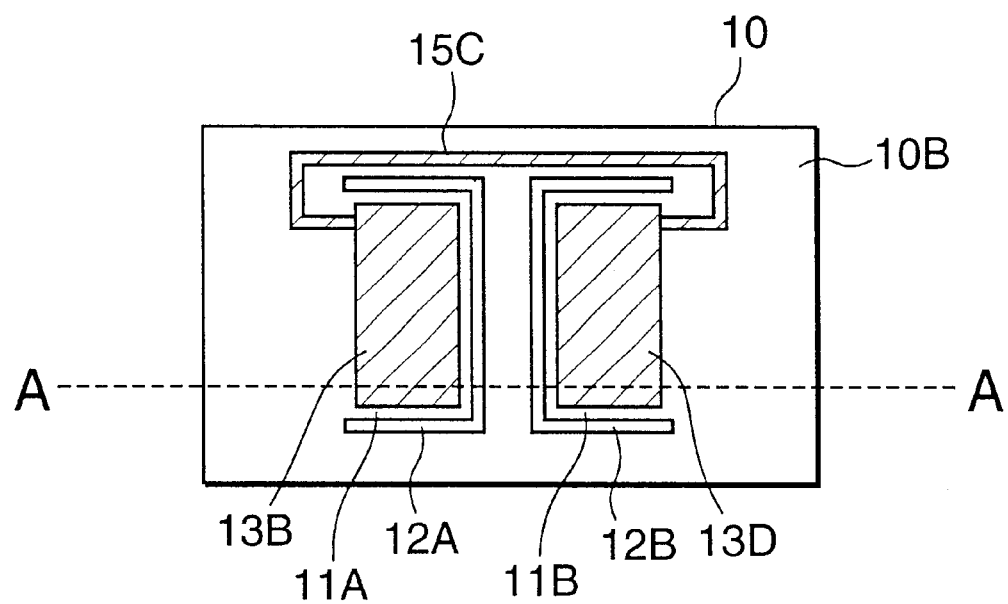
FIG. 2 is a bottom view for showing a configuration on a bottom surface of the substrate in the first embodiment.

A first embodiment of this invention is described. FIG. 1 shows a plan view of a substrate of a pyroelectric-type IR receiving element in accordance of the first embodiment. FIG. 2 shows a bottom view of the substrate.

As can be seen from FIGS. 1 and 2, two U-shaped slits 12A and 12B are symmetrically formed in a substrate 10 in a manner so that two rectangular portions 11A and 11B are supported by the substrate 10 in a cantilever fashion. Hereinafter, the rectangular portions 11A and 11B will be called "cantilever portions". The U-shaped slits 12A and 12B respectively have a pair of side slits and a base slit connecting the side slits. A pair of rectangular electrodes 13A and 13B are provided substantially at the center of the cantilever portion 11A on a top surface 10A and a bottom surface 10B of the substrate 10. Similarly, a pair of rectangular electrodes 13C and 13D are provided substantially at the center of the cantilever portion 11B on a top surface 10A and a bottom surface 10B of the substrate 10. The electrodes 13A to 13D have substantially the same size. The electrodes 13A and 13C serve as IR receiving portions. The electrode 13A faces the electrode 13B and the electrode 13C faces the electrode 13D with the substrate 10 between. The U-shaped slits 12A and 12B surround three sides of the electrodes 13A to 13D in a manner so that the IR receiving portions are supported by the substrate 10 in a cantilever fashion. The electrodes 13A to 13D are formed by vapor deposition, sputtering or screen printing.

Figure 10:
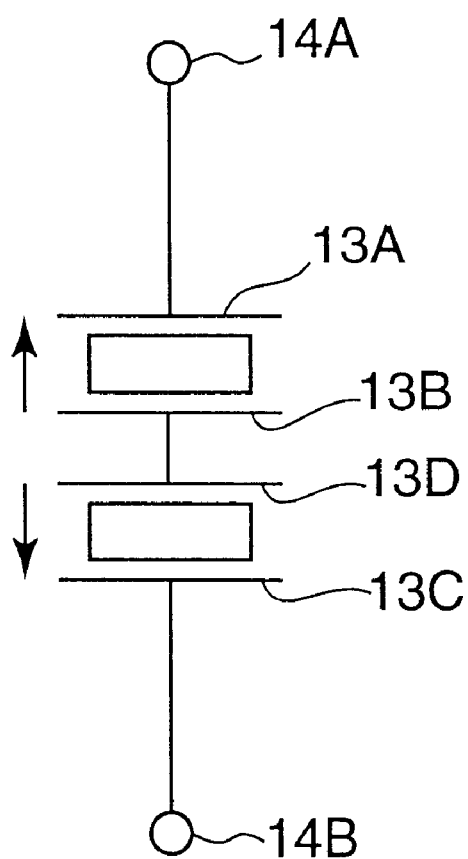
FIG. 10 is a circuit diagram for showing an equivalent circuit of the IR receiving element in the first embodiment.

A pair of terminals 14A and 14B, which are to be connected to an external circuit, are provided on the top surface 10A and in the vicinities of both ends of the substrate 10. The electrode 13A is connected to the terminal 14A by a conductive flat cable (conductive pattern) 15A, and the electrode 13C is connected to the terminal 14B by a conductive flat cable 15B. The electrodes 13B and 13D are connected by a conductive flat cable 15C. An equivalent circuit of the IR receiving element in the first embodiment is shown in FIG. 10 which is a series connection of two capacitors.

Figure 3:
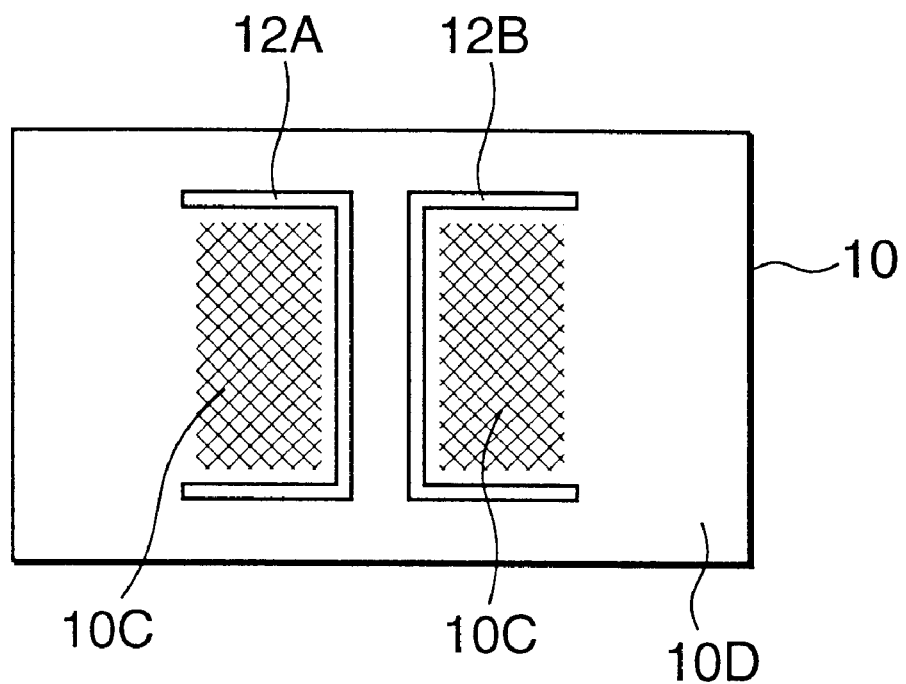
FIG. 3 is a map for showing polarization domains in the substrate in the first embodiment.
Figure 4:
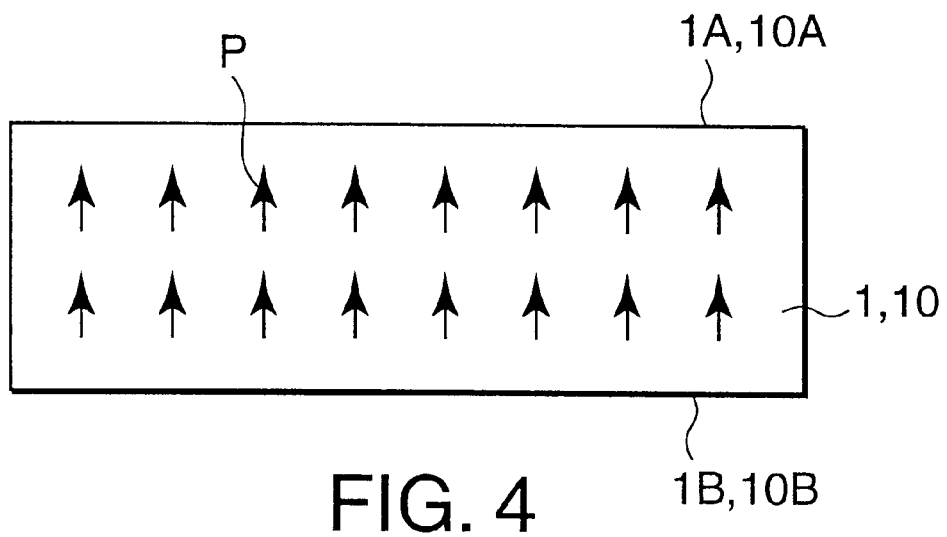
FIG. 4 is a notional view for showing directions of polarization vectors in the substrate in mono-polarized domain.
Figure 5:
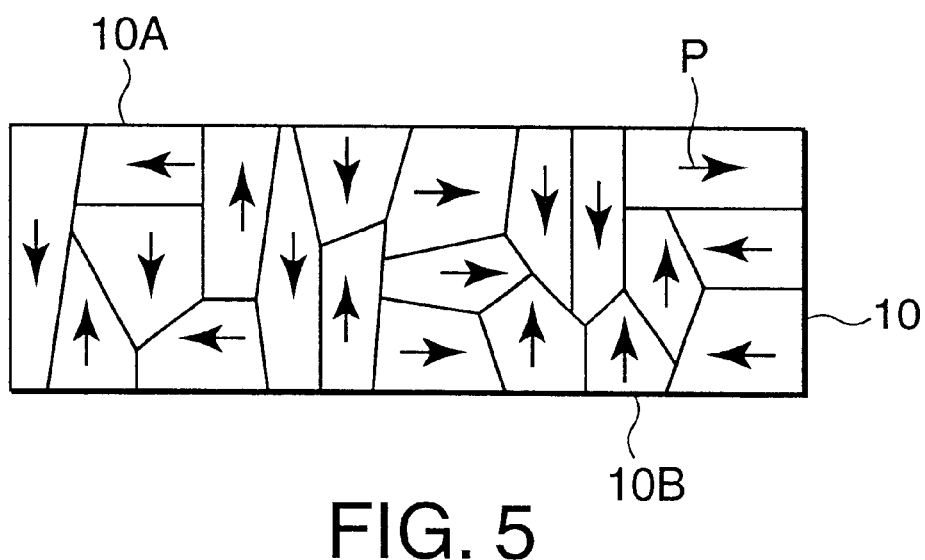
FIG. 5 is a notional view for showing directions of polarization vectors in the substrate in multi-polarized domain.

FIG. 3 shows a map of the polarization in the substrate 10. Two shaded domains 10C, which correspond to the electrodes 13A and 13C serving as the IR receiving portions, are uniformly polarized as shown in FIG. 4, which is called "single domain uniformly polarized". The remainder 10D not shaded is a mixture of minute domains respectively polarized at random or unpolarized as shown in FIG. 5, which is called "multi-domain".

Figure 6:
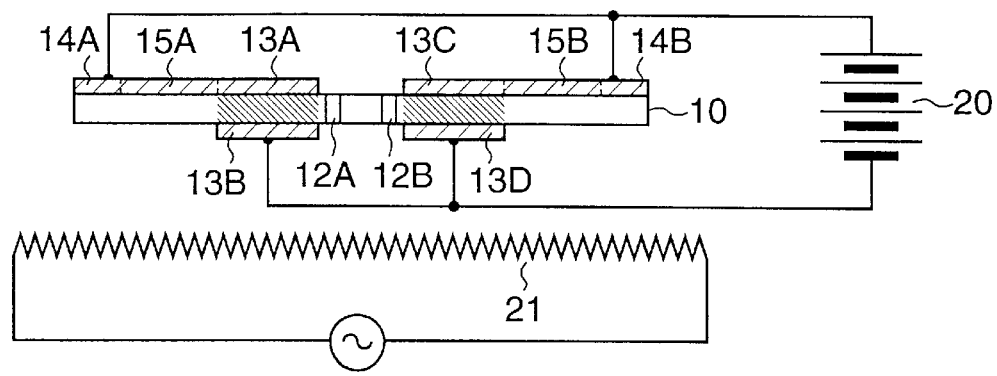
FIG. 6 is a sectional view for showing a method for polarizing the substrate in the first embodiment.

A method for polarizing the substrate 10 as shown in FIG. 3 is described with reference to FIG. 6. In FIG. 6, the substrate 10 is illustrated so that it is cut along A—A line in FIGS. 1 and 2. A DC electric power supply 20 having a predetermined voltage sufficient to polarizing pyroelectric material is connected between the terminal 14A and the electrode 13B, and between the terminal 14B and the electrode 13D. A heater 21 is used for heating the substrate 10, if necessary.

The substrate 10 is made of a ferroelectric material such as a ceramics of $PbTiO_3$ or $Pb(Ti+Zr)O_3$, a single crystal of $LiTaO_3$, or a high molecular compound of $PVF_2$. Thickness of the substrate 10 is, for example, in a range from several tens μm to several hundreds μm. The substrate 10 has been processed to be polarized at random, previously. When the substrate 10 is heated to be at a temperature equal to or higher than the Curie-point, the material of the substrate 10 transmits from the ferroelectric phase to the paraelectric phase, so that the polarity in the substrate 10 becomes at random. Alternatively, it is possible to use the pyroelectric substrate as it is, in which the polarization therein is at random, just after crystal growth or calcination.

By the above-mentioned configuration, when the voltage of the DC electric power supply 20 is applied, electric fields occur only between the electrodes 13A and 13B, and between the electrodes 13C and 13D, so that the portions in the substrate 10 corresponding to the IR receiving portions are uniformly polarized. The condition for the polarization generally depends on the material of the pyroelectric substrate 10. The inventors have been experimented and found that it was necessary to apply a very large electric field equal to or larger than $10^7$ V/m under the temperature region from 150 to 250 degrees Celsius, for example, when commercially available single-crystaline lithium tantalate was used as a material of the substrate 10.

Since the thickness of the substrate 10 is very thin about several tens μm to several hundreds μm, it is easy to occur the dielectric breakdown in the substrate 10 when a high voltage is applied between the top surface 10A and the bottom surface 10B of the substrate 10 in the atmosphere. Thus, it is preferable to treat the polarization of the substrate 10 in vacuum, or in an electric insulation gas such as $N_2$, $CO_2$, $SF_6$, and so on.

Figure 7:
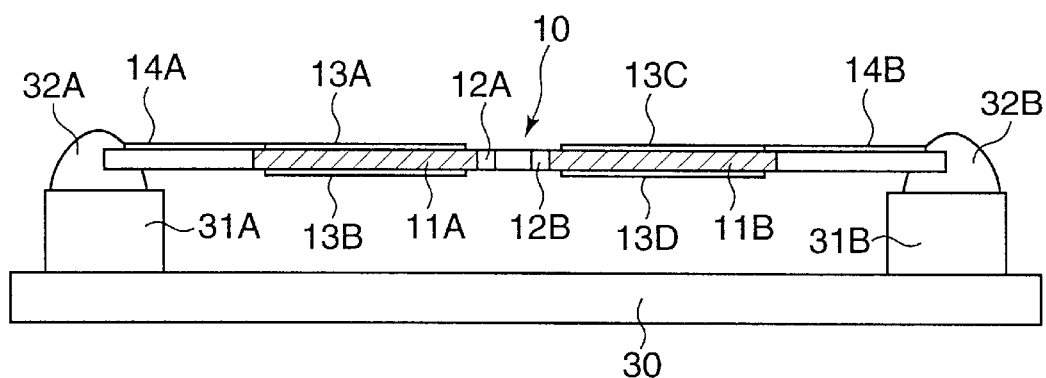
FIG. 7 is a sectional view for showing a configuration of a pyroelectric-type IR receiving element in the first embodiment.
Figure 37:
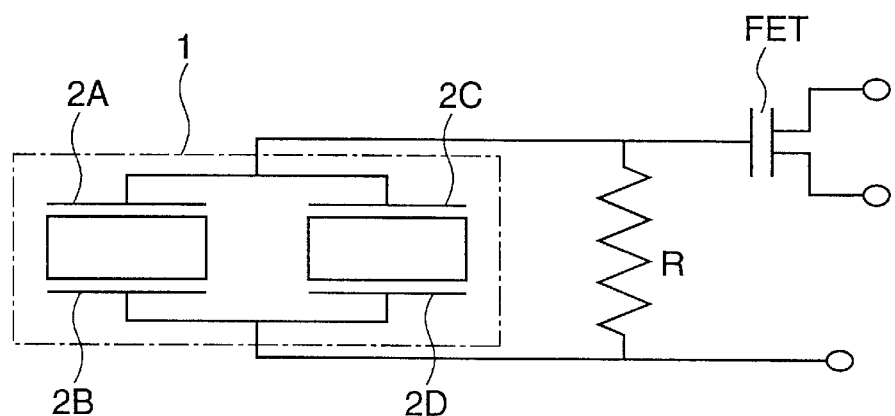
FIG. 37 is a circuit diagram for showing an equivalent circuit of the conventional IR receiving element.
Figure 38:
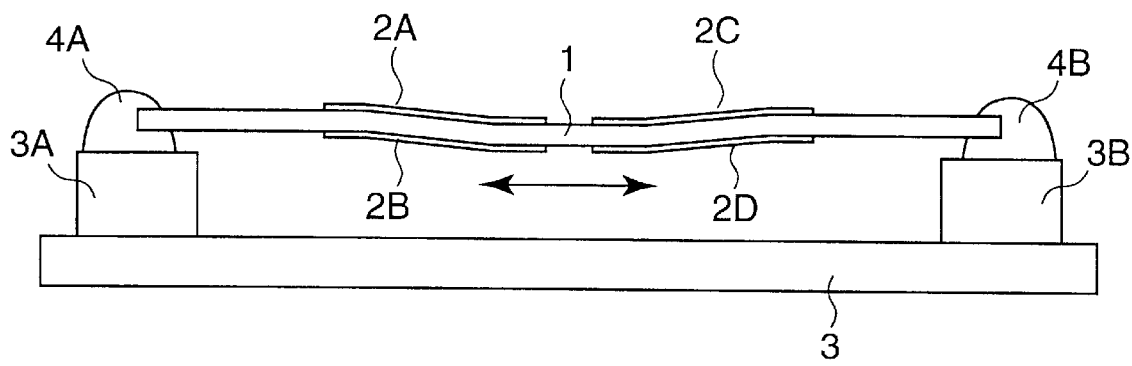
FIG. 38 is a sectional view for showing a problem of warp of a substrate in the conventional IR receiving element.

FIG. 7 shows a configuration of a pyroelectric-type IR receiving element using the above-mentioned substrate 10. As can be seen from FIG. 7, both sides of the substrate 10 are fixed to stands 31A and 31B formed on a base member 30 by conductive adhesives 32A and 32B. The terminals 14A and 14B are respectively contacted to an external circuit by the conductive adhesives 32A and 32B. The configuration of the equivalent circuit of the pyroelectric-type IR receiving element is substantially the same as that shown in FIG. 37, so that the explanation of the equivalent circuit is omitted.

Figure 8:
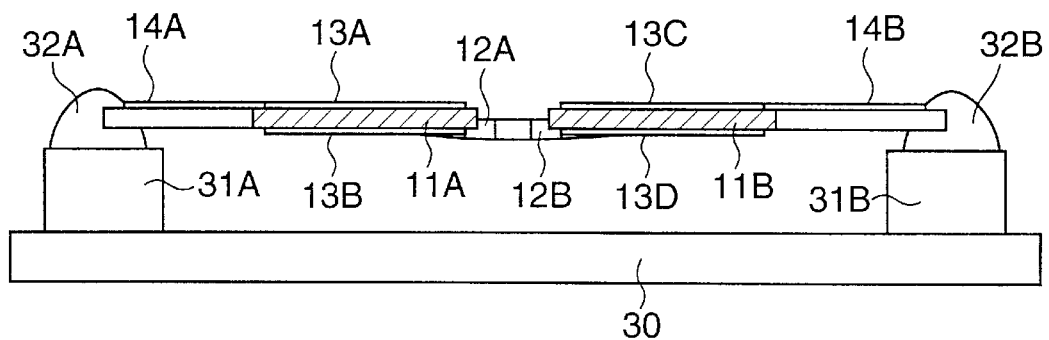
FIG. 8 is a sectional view for showing effects of the IR receiving element in the first embodiment, when the substrate is warped.

Even when ambient temperature of the substrate 10 is varied and the substrate 10 is warped as shown in FIG. 8 due to a difference of thermal coefficients between the substrate 10 and the base member 30, the cantilever portions 11A and 11B are respectively supported in the cantilever fashion, so that the cantilever portions 11A and 11B may not be warped. No electric charge is locally charged in the cantilever portions 11A and 11B due to the piezoelectric effect of the substrate 10. Furthermore, the domain 10D of the substrate 10 except the domains 10C is configured by multiple minute portions polarized at random as shown in FIG. 5, so that electric charges due to the piezoelectric effect of the substrate 10 when it is warped can be canceled by the random polarization. Thus, the popcorn noise hardly occurs in the pyroelectric-type IR receiving element in accordance with the first embodiment.

Figure 9:
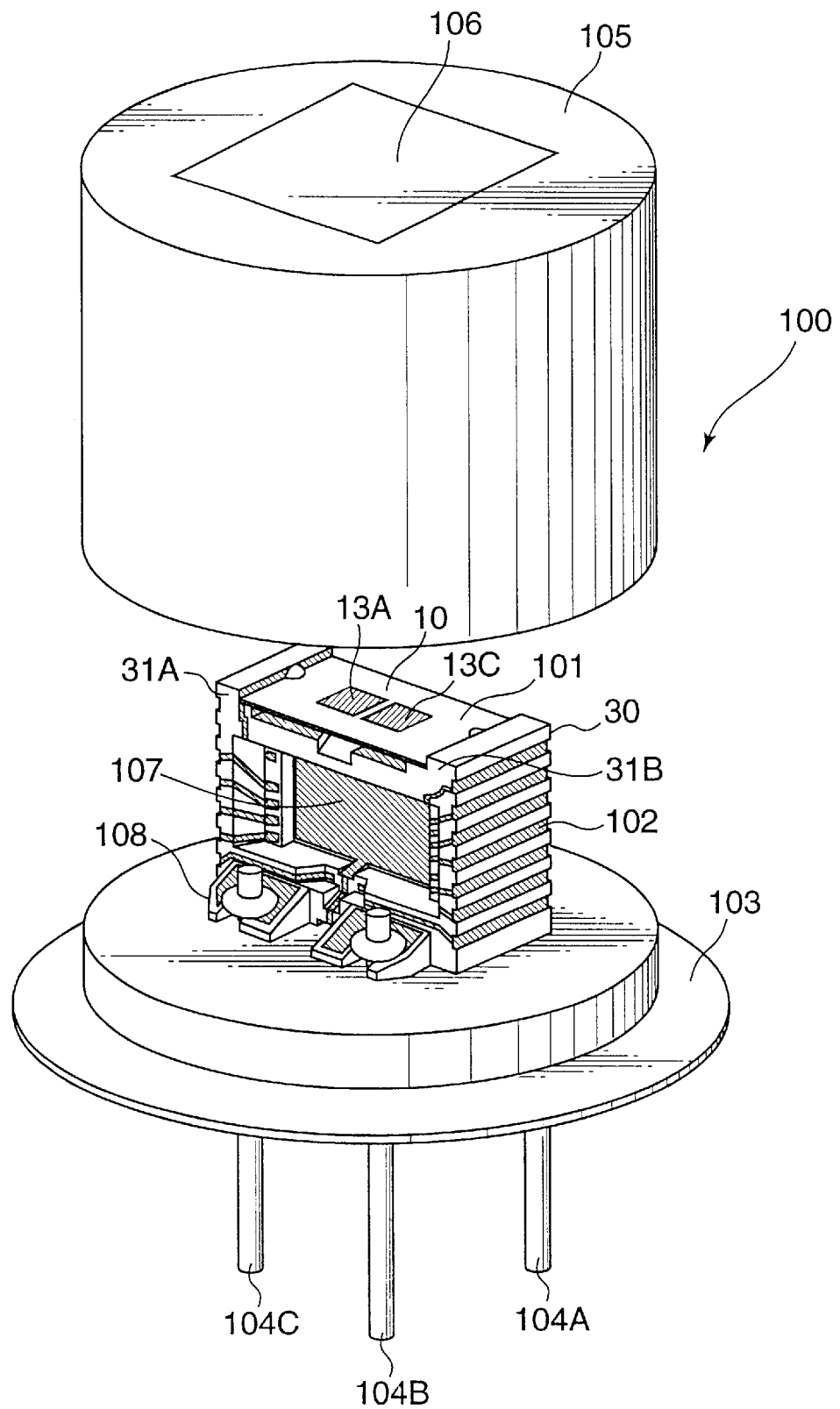
FIG. 9 is a perspective view for showing a configuration of an IR sensor in the first embodiment.

FIG. 9 shown a configuration of an IR sensor using the above-mentioned pyroelectric-type IR receiving element in the first embodiment. The IR sensor 100 comprises the IR receiving element 101, a three-dimensional circuit block 102 on which the IR receiving element 101 is mounted, a chassis 103 from which three pins 104A to 104C are projected, and a cover 105 with an IR transmittable window 106. Top end of the circuit block 102 serves the base member 30 of the IR receiving element with the stands 31A and 31B. An IC chip 107 is fixed in an IC chip holder on a front wall of the circuit block 102. A pair of stabilizers 108 are formed at bottom end of the front wall by which the circuit block 102 is fixed on the chassis 103.

When IR reach to the IR receiving element 101 through the window 106, energy of the IR is converted to thermal energy, and temperature at the electrodes 113A and 113C increases. When the temperature of the substrate 10 is varied, pyroelectric charges occur in the substrate 10 owing to variation of spontaneous polarization of the pyroelectric material. The occurrence of the pyroelectric charges in the substrate 10 can be sensed by variation of voltage signals through a resistor R and a field-effect transistor FET in the equivalent circuit, for example, shown in FIG. 37. As a result, incidence of the IR into the IR receiving element can be sensed.

Second Embodiment

A second embodiment of this invention is described. In the above-mentioned first embodiment, the IR receiving sensor has two IR receiving portions are used, which is generally called "dual-type IR receiving element". An IR receiving sensor in the second embodiment has four IR receiving portions, which is generally called "quadruple-type IR receiving element". The differences between the first embodiment and the second embodiment will be mainly described, and the common details will be omitted.

Figure 11:
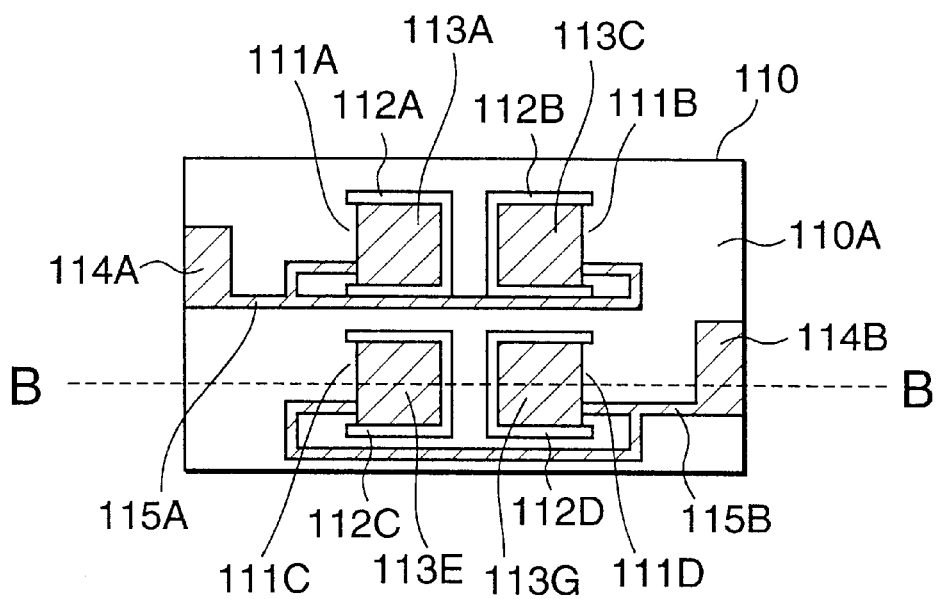
FIG. 11 is a plan view for showing a configuration on a top surface of a substrate of a pyroelectric-type IR receiving element in a second embodiment of this invention.
Figure 12:
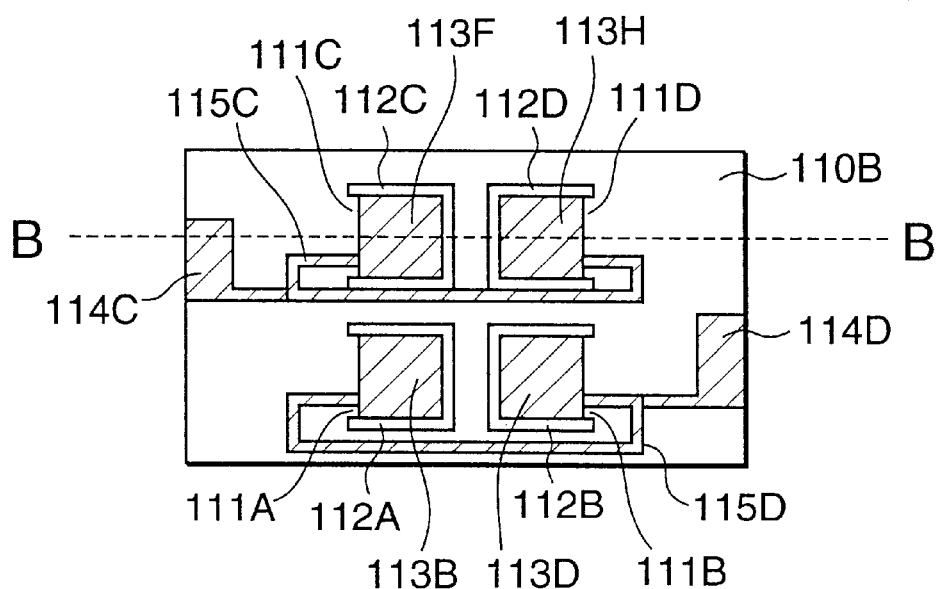
FIG. 12 is a bottom view for showing a configuration on a bottom surface of the substrate in the second embodiment.

FIG. 11 shows a plan view of a substrate of a pyroelectric-type IR receiving element in accordance of the second embodiment. FIG. 12 shows a bottom view of the substrate. As can be seen from FIGS. 11 and 12, four U-shaped slits 112A to 112D are formed in a substrate 110 in a manner so that four cantilever portions 111A to 111D are formed in the substrate 110. Each U-shaped slits 112A to 112D is substantially the same as the U-shaped slit 12A or 12B. Four pairs of rectangular electrodes 113A and 113B, 113C and 113D, 113E and 113F, and 113G and 113H are respectively provided substantially at the center of the cantilever portions 111A to 111D on a top surface 110A and a bottom surface 110B of the substrate 110. The electrodes 113A, 113C, 113E and 113G serve as IR receiving portions.

Figure 17:
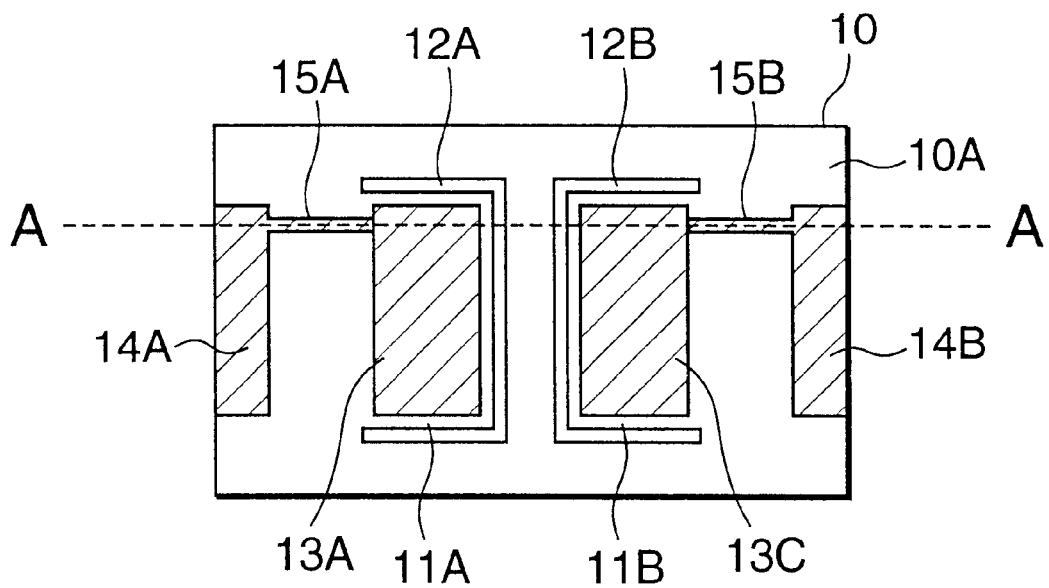
FIG. 17 is a plan view for showing a configuration on a top surface of a substrate of a pyroelectric-type IR receiving element in a third embodiment of this invention.

A pair of terminals 114A and 114B, which are to be connected to an external circuit, are provided on the top surface 110A and in the vicinities of both ends of the substrate 110. The electrodes 113A and 113C are connected to the terminal 114A by conductive flat cables 115A, and the electrodes 113E and 113G are connected to the terminal 114B by conductive flat cables 115B. Similarly, a pair of terminals 114C and 114D, which are to be connected to the external circuit, are provided on the bottom surface 110B and in the vicinities of both ends of the substrate 110. The electrodes 113B and 113D are connected to the terminal 114D by conductive flat cables 115D, and the electrodes 113F and 113H are connected to the terminal 114C by conductive flat cables 115C. Two pairs of the terminals 114A and 114C, and 114B and 114D will be short-circuited by after treatment such as a conductive adhesive. An equivalent circuit of the IR receiving element in the second embodiment is shown in FIG. 17 which is a parallel circuit of four capacitors.

Figure 13:
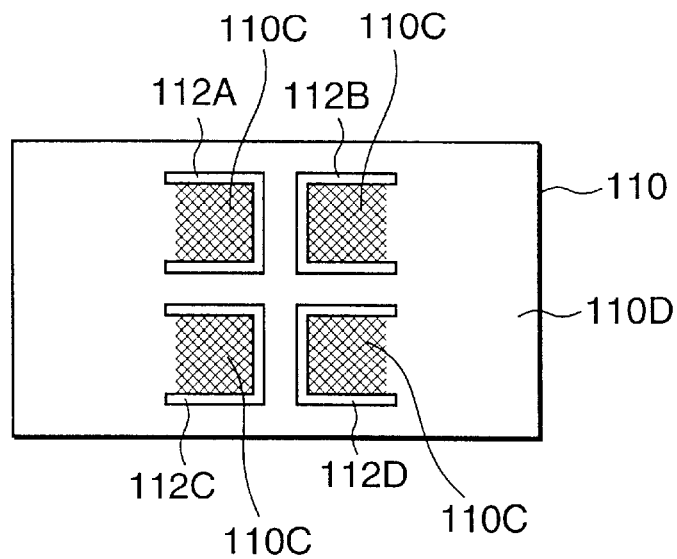
FIG. 13 is a map for showing polarization domains in the substrate in the second embodiment.

FIG. 13 shows a map of the polarization in the substrate 110. Four shaded domains 110C, which correspond to the electrodes 113A, 113C, 113E and 113G serving as the IR receiving portions, are uniformly polarized as shown in FIG. 4. The remainder 110D not shaded is a mixture of minute domains respectively polarized at random as shown in FIG. 5.

Figure 14:
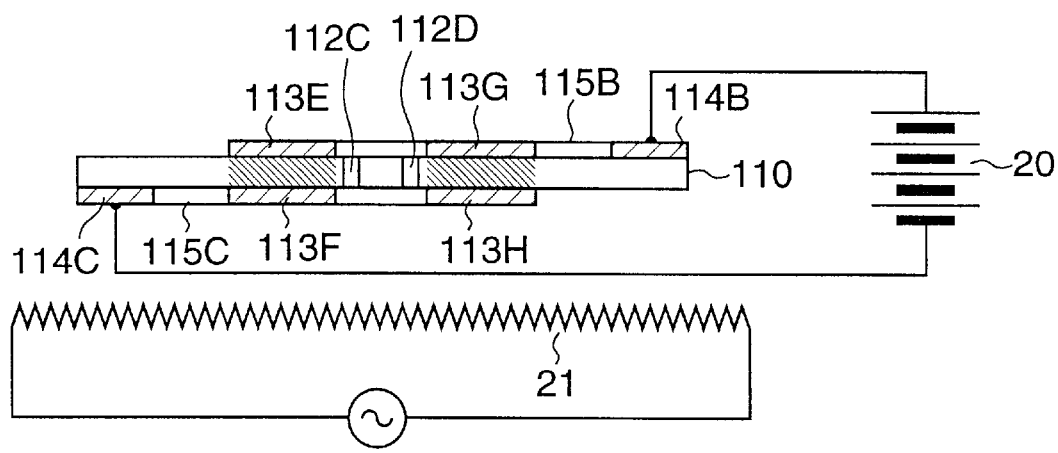
FIG. 14 is a sectional view for showing a method for polarizing the substrate in the second embodiment.

A method for polarizing the substrate 110 in the second embodiment shown in FIG. 14 is essentially the same as that in the first embodiment. However, the electrodes 113E and 113G are connected to the terminal 114B, and the electrodes 113F and 113H are connected to the terminal 114C, so that the DC electric power supply 20 is connected between the terminals 114B and 114C. With respect to the electrodes 113A to 114D not shown in FIG. 14, substantially the same manner can be applied.

Figure 15:
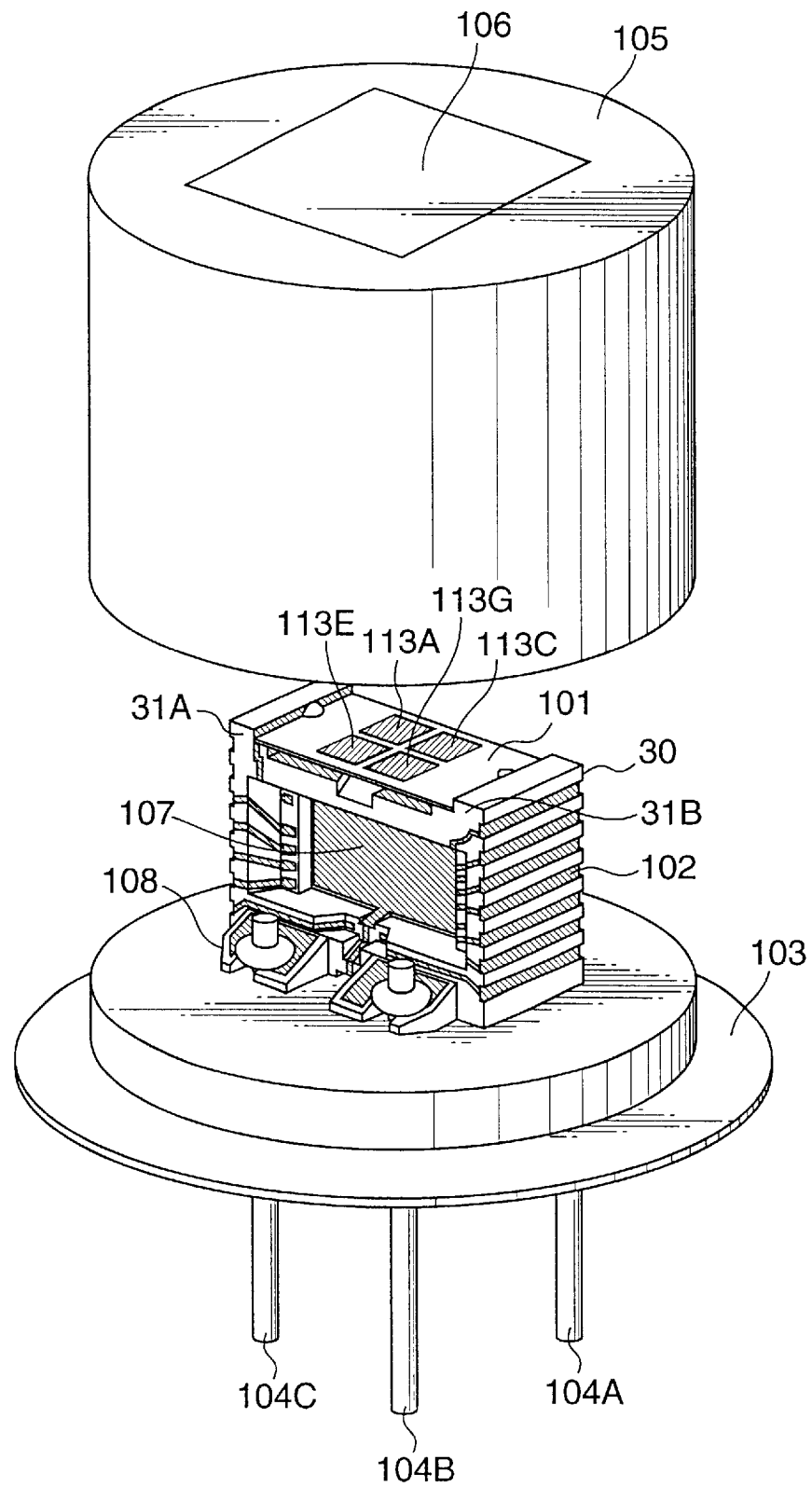
FIG. 15 is a perspective view for showing a configuration of an IR sensor in the second embodiment.

An IR sensor in the second embodiment is shown in FIG. 15. Most of the details of the IR sensor in the second embodiment is the same as those in the first embodiment (see FIG. 9), except the number of the IR receiving portions. Detailed description of the IR sensor is omitted.

Third Embodiment

A third embodiment of this invention is described. The third embodiment relates to the dual-type IR receiving element which is a modification of the first embodiment. The differences between the first embodiment and the third embodiment will be mainly described, and the common details will be omitted.

Figure 18:
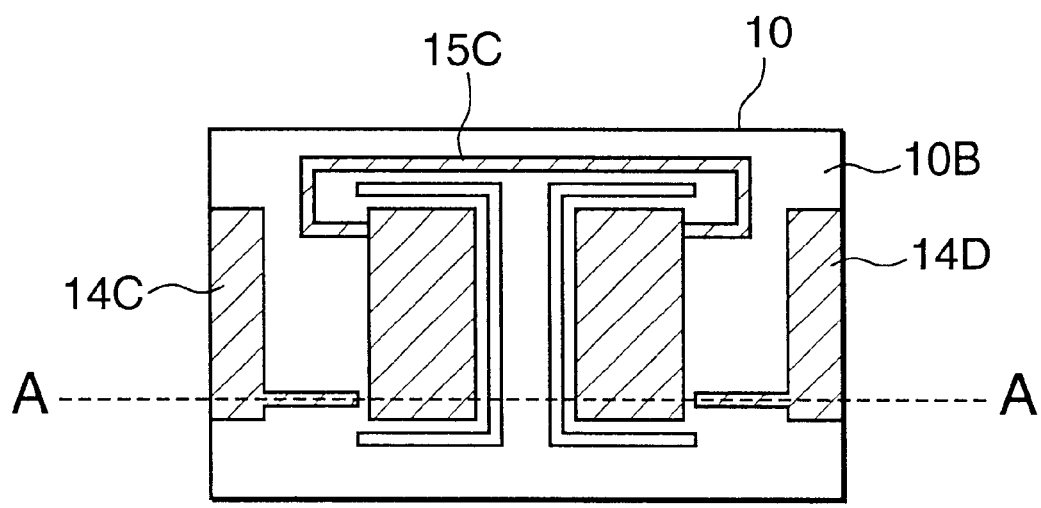
FIG. 18 is a bottom view for showing a configuration on a bottom surface of the substrate in the third embodiment.

FIG. 17 shows a plan view of a substrate of a pyroelectric-type IR receiving element in accordance of the third embodiment. FIG. 18 shows a bottom view of the substrate. FIG. 17 is the same as FIG. 1. FIG. 18, however, further shows two terminals 14C and 14D provided on the bottom surface 10B of the substrate 10. The terminals 14C and 14D respectively have protruded portions facing the conductive flat cables 15A and 15B. An equivalent circuit of the IR receiving element in the third embodiment is substantially the same as that in the first embodiment shown in FIG. 10.

Figure 19:
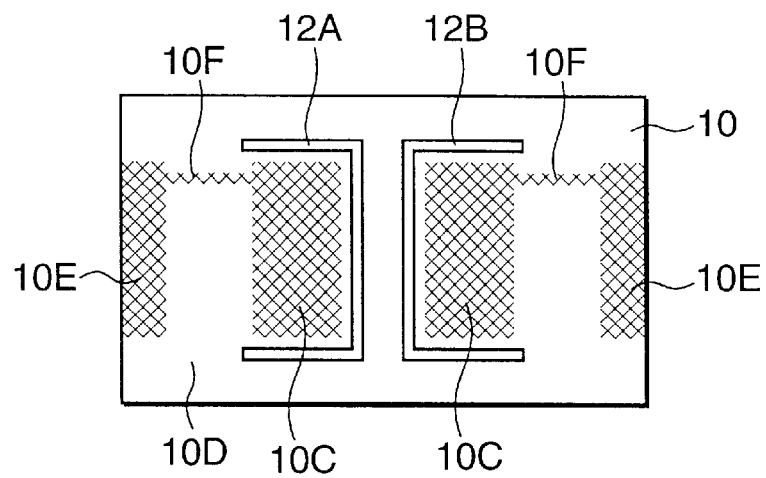
FIG. 19 is a map for showing polarization domains in the substrate in the third embodiment.

FIG. 19 shows a map of the polarization in the substrate 10. Shaded domains 10C, 10E and 10F which respectively correspond to the electrodes 13A and 13C serving as the IR receiving portions, the terminals 14A (or 14C) and 14B (or 14D), and the cables 15A and 15B are uniformly polarized as shown in FIG. 4. The remainder 10D not shaded is a mixture of minute domains respectively polarized at random as shown in FIG. 5.

Figure 20:
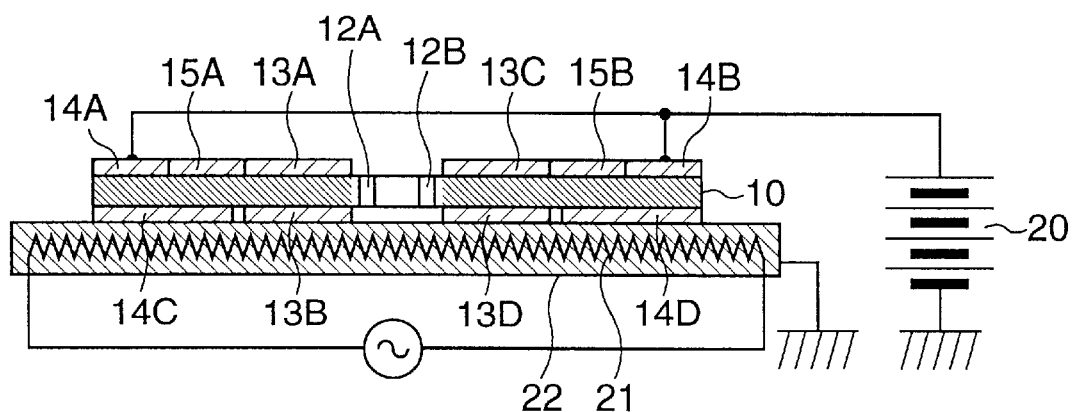
FIG. 20 is a sectional view for showing a method for polarizing the substrate in the third embodiment.

A method for polarizing the substrate 10 as shown in FIG. 19 is described with reference to FIG. 20. In FIG. 20, the substrate 10 is illustrated so that it is cut along A—A line in FIGS. 17 and 18. A removable flat electrode 22 including a heater 21 is tightly contact with the surfaces of the electrodes 13B and 13D and with the surfaces of the terminals 14C and 14D. A DC electric power supply 20 having a predetermined voltage sufficient to polarizing pyroelectric material is connected between the terminals 14A, 14D and the flat electrode 22 via the ground. The heater 21 is used for heating the substrate 10, if necessary.

By the above-mentioned configuration, when the voltage of the DC electric power supply 20 is applied, electric fields occur between the conductive patterns on the top surface 10A (i.e., the electrodes 13A and 13B, the terminals 14A and 14B and the flat cable 15A and 15B) and the flat electrode 22. The portions in the substrate 10 uniformly polarized expand larger than the IR receiving portions. However, the pairs of the terminals 14A and 14C, and 14B and 14D will respectively be short-circuited by, for example, conductive adhesives. Thus, even when electric charge, which will be the cause of the popcorn noises, occurs in the portion uniformly polarized due to change of ambience, the electric charge quickly couples with another ion, or the like, on those short-circuited area, so that no electric signal caused by the undesired electric charge can be observed.

Fourth Embodiment

Figure 25:
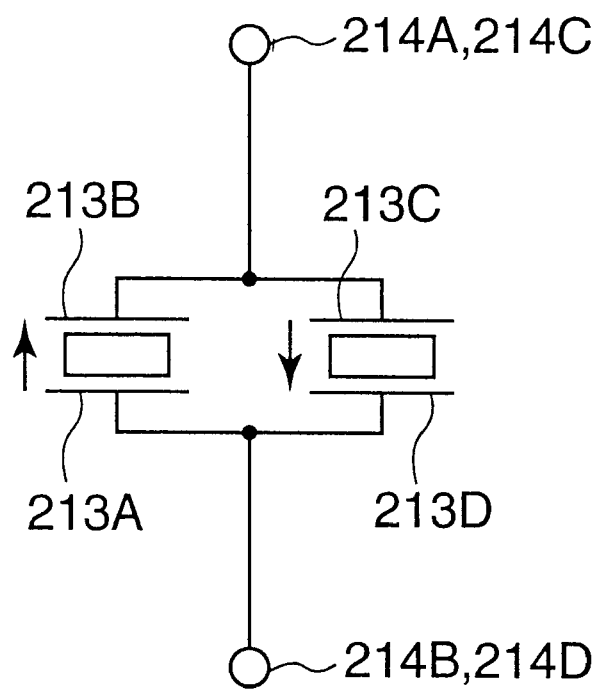
FIG. 25 is a circuit diagram for showing an equivalent circuit of the IR receiving element in the fourth embodiment.

A fourth embodiment of this invention is described. At first, an equivalent circuit of an IR receiving element in the fourth embodiment is shown in FIG. 25. In comparison with FIGS. 25 and 10, the equivalent circuit in the fourth embodiment is a parallel circuit of two capacitors, instead of the series circuit of two capacitors in the first embodiment. The differences between the first embodiment and the fourth embodiment will be mainly described, and the common details will be omitted.

Figure 21:
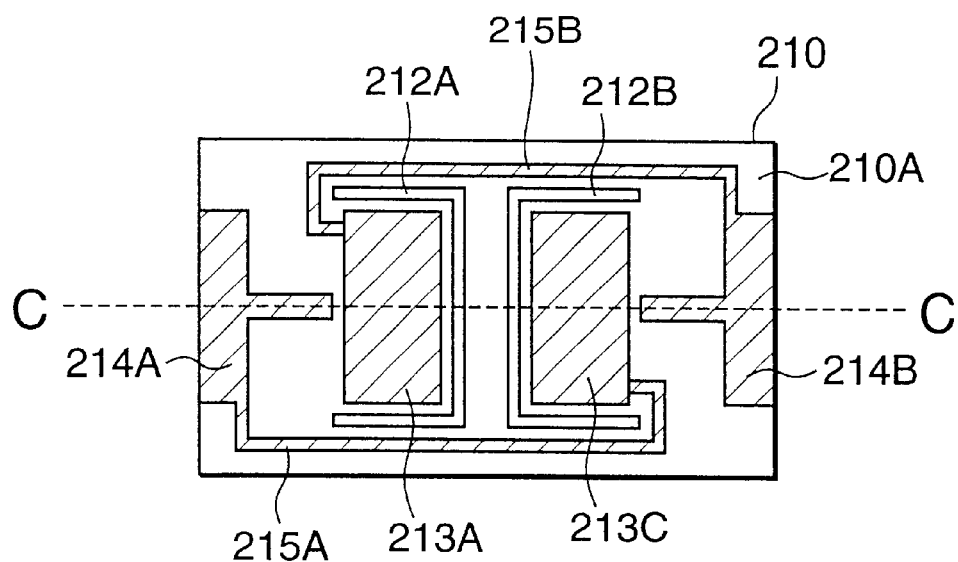
FIG. 21 is a plan view for showing a configuration on a top surface of a substrate of a pyroelectric-type IR receiving element in a fourth embodiment of this invention.
Figure 22:
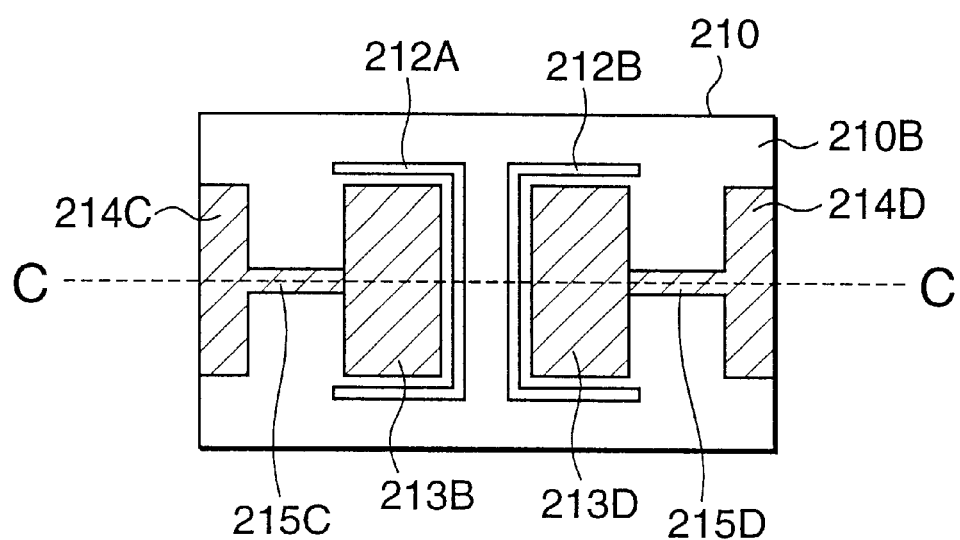
FIG. 22 is a bottom view for showing a configuration on a bottom surface of the substrate in the fourth embodiment.

FIG. 21 shows a plan view of a substrate of a pyroelectric-type IR receiving element in accordance of the fourth embodiment. FIG. 22 shows a bottom view of the substrate. As can be seen from FIG. 21, a terminal 214A positioned at left end on a top surface 210A of a substrate 210 is connected to an electrode 213C positioned at right side by a conductive flat cable 215A, and a terminal 214B positioned at right end on the top surface 210A of the substrate 210 is connected to an electrode 213A positioned at left side by a conductive flat cable 215B. As can be seen from FIG. 22, a terminal 214C positioned at left end on a bottom surface 210B of the substrate 210 is connected to an electrode 213B positioned at left side by a conductive flat cable 215C, and a terminal 214D positioned at right end on the bottom surface 210B of the substrate 210 is connected to an electrode 213D positioned at right side by a conductive flat cable 215D. By such a configuration, two capacitors formed between two pairs of electrodes 214A and 214B, and 214C and 214D are connected in parallel. U-shaped slits 212A and 212B are substantially the same as those 12A and 12B in the first embodiment.

Figure 23:
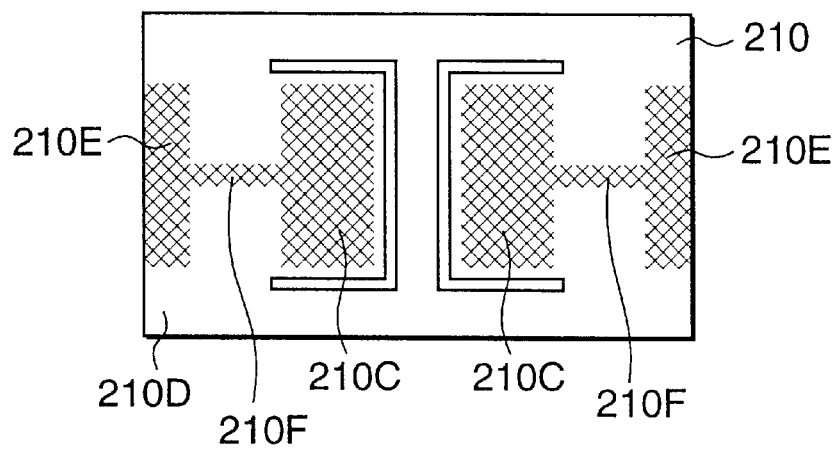
FIG. 23 is a map for showing polarization domains in the substrate in the fourth embodiment.

FIG. 23 shows a map of the polarization in the substrate 210. Shaded domains 210C, 210E and 210F which respectively correspond to the electrodes 213A and 213C serving as the IR receiving portions, the terminals 214A (or 214C) and 214B (or 214D), and the cables 215C and 215D are uniformly polarized as shown in FIG. 4. The remainder 210D not shaded is a mixture of minute domains respectively polarized at random as shown in FIG. 5.

Figure 24:
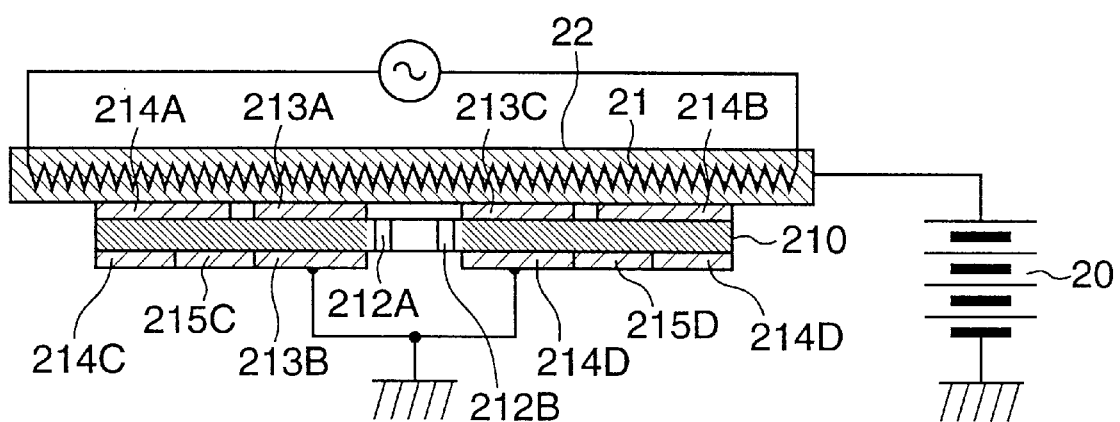
FIG. 24 is a sectional view for showing a method for polarizing the substrate in the fourth embodiment.

A method for polarizing the substrate 210 as shown in FIG. 23 is described with reference to FIG. 24. In FIG. 24, the substrate 10 is illustrated so that it is cut along C—C line in FIGS. 21 and 22. A removable flat electrode 22 including a heater 21 is tightly contact with the surfaces of the electrodes 213A and 213C and with the surfaces of the terminals 214A and 214B. A DC electric power supply 20 having a predetermined voltage sufficient to polarizing pyroelectric material is connected between the electrodes 213B and 213D or terminals 214C and 214D and the flat electrode 22 via the ground. The heater 21 is used for heating the substrate 210, if necessary.

By the above-mentioned configuration, when the voltage of the DC electric power supply 20 is applied, electric fields occur between the flat electrode 22 and the conductive patterns on the bottom surface 210B (i.e., the electrodes 213B and 213D, the terminals 214C and 214D and the flat cable 215C and 215D). The portions in the substrate 210 uniformly polarized expand larger than the IR receiving portions. However, the pairs of the terminals 214A and 214C, and 214B and 214D will respectively be short-circuited by, for example, conductive adhesives. Thus, even when electric charge, which will be the cause of the popcorn noises, occurs in the portion uniformly polarized due to change of ambience, the electric charge quickly couples with another ion, or the like, on those short-circuited area, so that no electric signal caused by the undesired electric charge can be observed.

Fifth Embodiment

Figure 16:
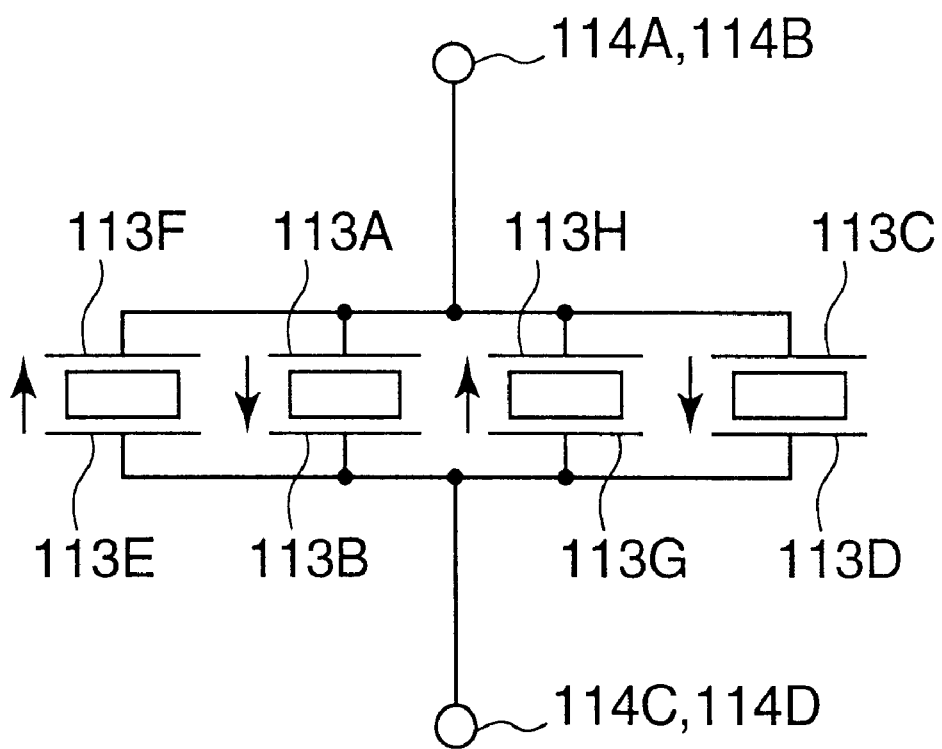
FIG. 16 is a circuit diagram for showing an equivalent circuit of the IR receiving element in the second embodiment.

A fifth embodiment of this invention is described. The fifth embodiment is a modification of the above-mentioned second embodiment. An equivalent circuit of an IR receiving element in the fifth embodiment is the same as that in the second embodiment shown in FIG. 16. The differences between the second embodiment and the fifth embodiment will be mainly described, and the common details will be omitted.

Figure 26:
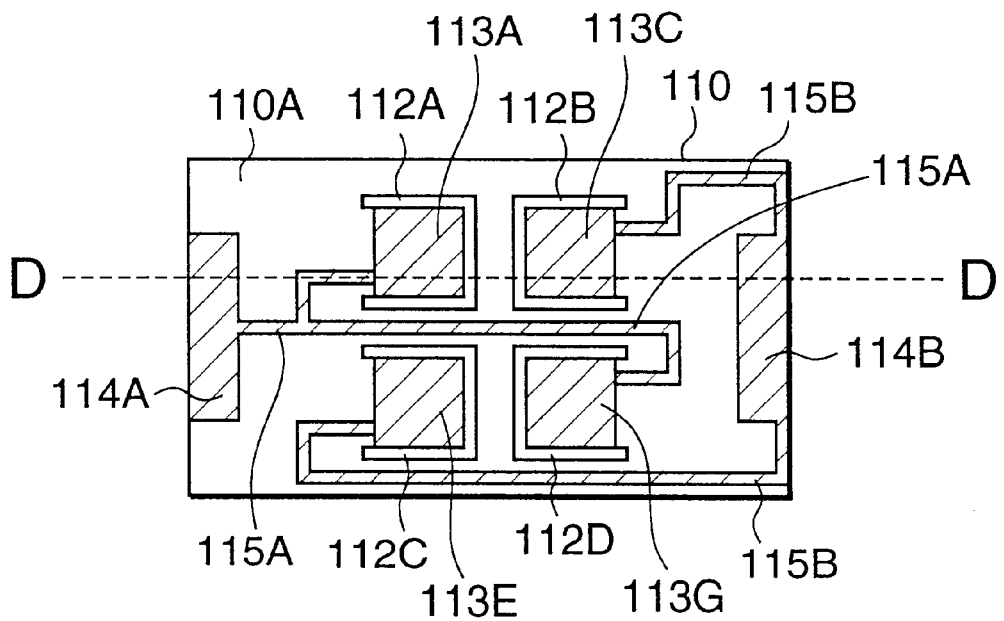
FIG. 26 is a plan view for showing a configuration on a top surface of a substrate of a pyroelectric-type IR receiving element in a fifth embodiment of this invention.
Figure 27:
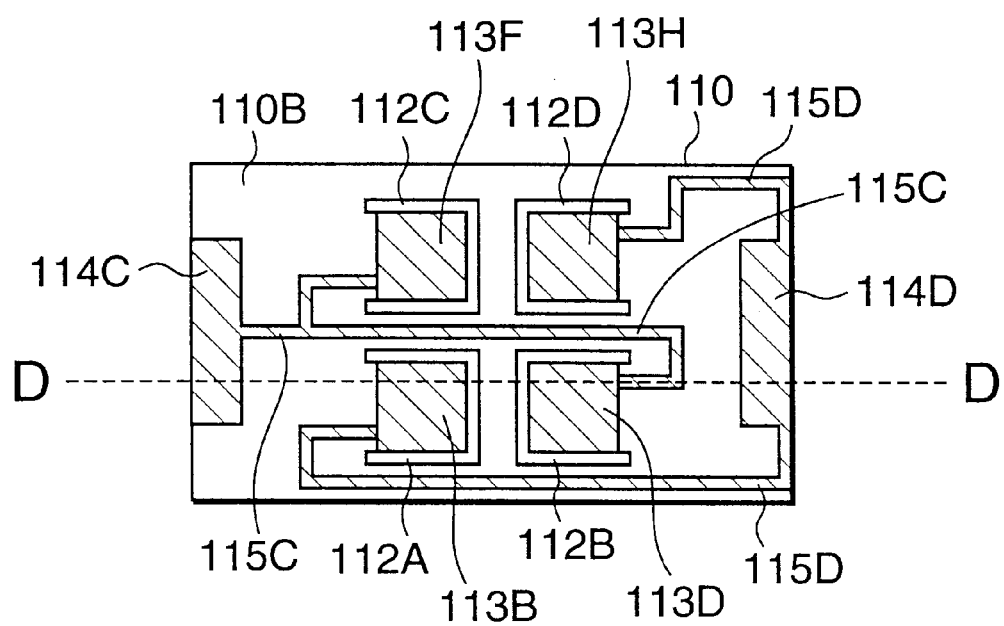
FIG. 27 is a bottom view for showing a configuration on a bottom surface of the substrate in the fifth embodiment.

FIG. 26 shows a plan view of a substrate of a pyroelectric-type IR receiving element in accordance of the fifth embodiment. FIG. 27 shows a bottom view of the substrate. As can be seen from FIGS. 26 and 27, conductive patterns on a top surface 110A and 110B of a substrate is substantially the same.

A terminal 114A positioned at left end on a top surface 110A of a substrate 110 is connected to electrodes 113A and 113G by conductive flat cables 115A. A terminal 114B positioned at right end on the top surface 110A of the substrate 110 is connected to electrodes 113C and 113E by conductive flat cables 115B. A terminal 114C positioned at left end on a bottom surface 110B of the substrate 110 is connected to electrodes 113D and 113F by conductive flat cables 115C. A terminal 114D positioned at right end on the bottom surface 110B of the substrate 110 is connected to electrodes 113B and 113H by conductive flat cables 115D.

Figure 28:
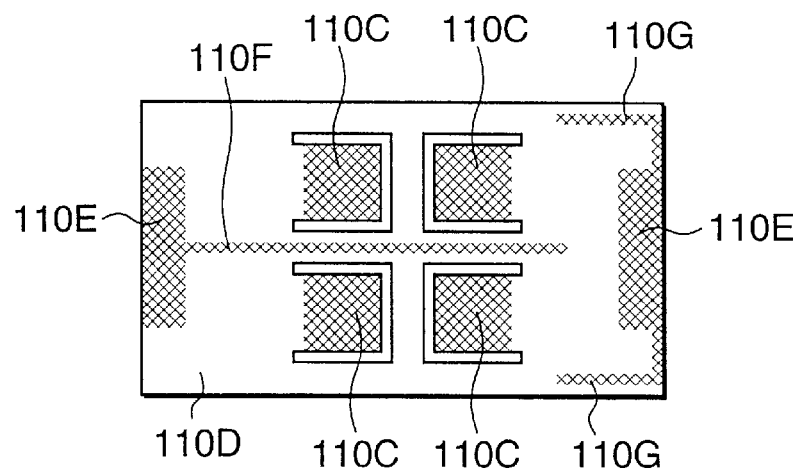
FIG. 28 is a map for showing polarization domains in the substrate in the fifth embodiment.

FIG. 28 shows a map of the polarization in the substrate 110. Four shaded domains 110C corresponding to the electrodes 113A, 113C, 113E and 113G serving as the IR receiving portions, two shaded domains 110E corresponding to the terminals 114A (or 114C) and 114B (or 114D), and a shaded domain 110F corresponding to an overlapped portion of the cables 115A and 115C, and shaded domains 110G corresponding to overlapped portions of the cables 115B and 115D are uniformly polarized as shown in FIG. 4. The remainder 110D not shaded is a mixture of minute domains respectively polarized at random as shown in FIG. 5.

Figure 29:
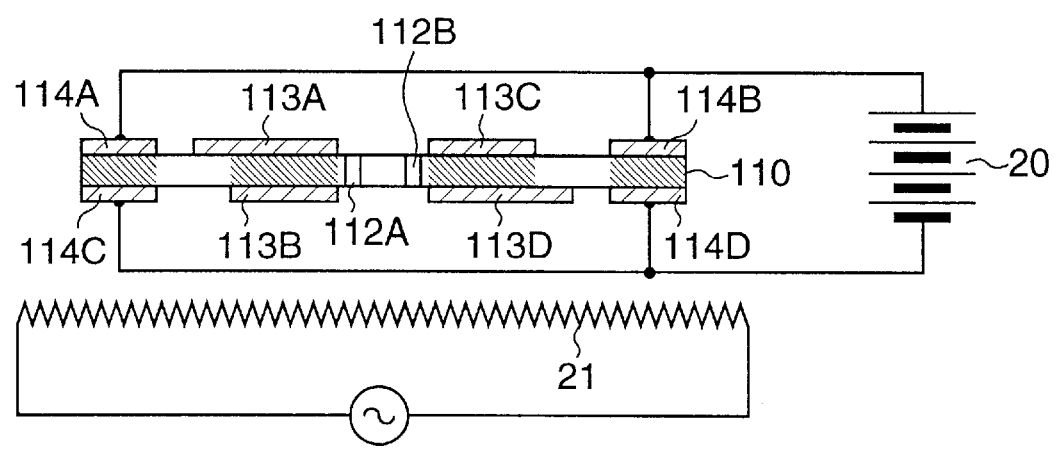
FIG. 29 is a sectional view for showing a method for polarizing the substrate in the fifth embodiment.

A method for polarizing the substrate 110 in the fifth embodiment is shown in FIG. 29. In FIG. 29, the substrate 110 is illustrated so that it is cut along D—D line in FIGS. 26 and 27. A DC electric power supply 20 is connected between the terminals 114A and 114C, and between the terminals 114B and 114D. A heater 21 is used for heating the substrate 110, if necessary.

By the above-mentioned configuration, when the voltage of the DC electric power supply 20 is applied, electric fields occur between the electrodes 113A and 113B, between the electrodes 113C and 113D, between the electrodes 113E and 113F, between the electrodes 113G and 113H, between the terminals 114A and 114C, between the terminals 114B and 114D, between the overlapped portions of the flat cables 115A and 115C, and between the overlapped portions of the flat cables 115B and 115D. The portions in the substrate 110 uniformly polarized expand larger than the IR receiving portions. However, the pairs of the terminals 114A and 114C, and 114B and 114D will respectively be short-circuited by, for example, conductive adhesives. Thus, even when electric charge, which will be the cause of the popcorn noises, occurs in the portion uniformly polarized due to change of ambience, the electric charge quickly couples with another ion, or the like, on those short-circuited area, so that no electric signal caused by the undesired electric charge can be observed.

Experimental Result

Figure 30:
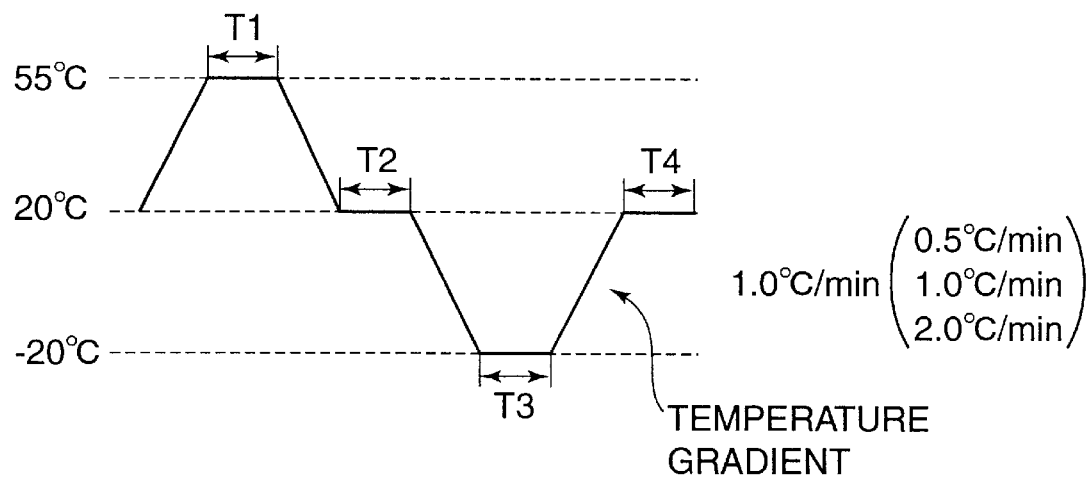
FIG. 30 is a graph for showing a waveform of a heat cycle applied to samples used in an experiment for proving effects of this invention.
Figure 31:
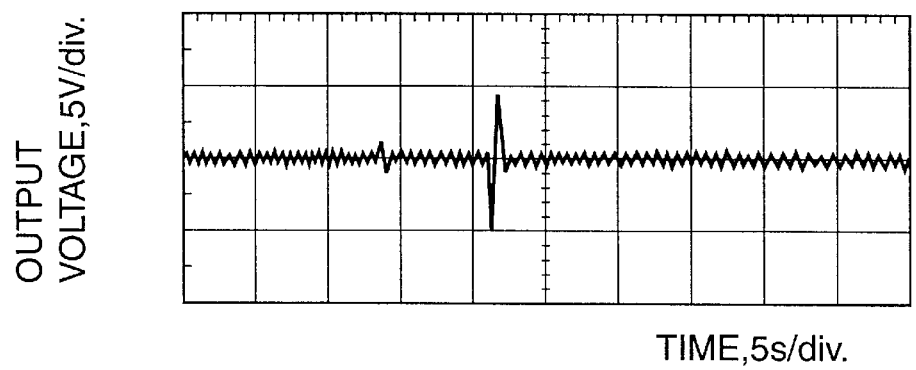
FIG. 31 is a graph for showing a waveform of a popcorn noise observed by an oscilloscope.
Figure 32:
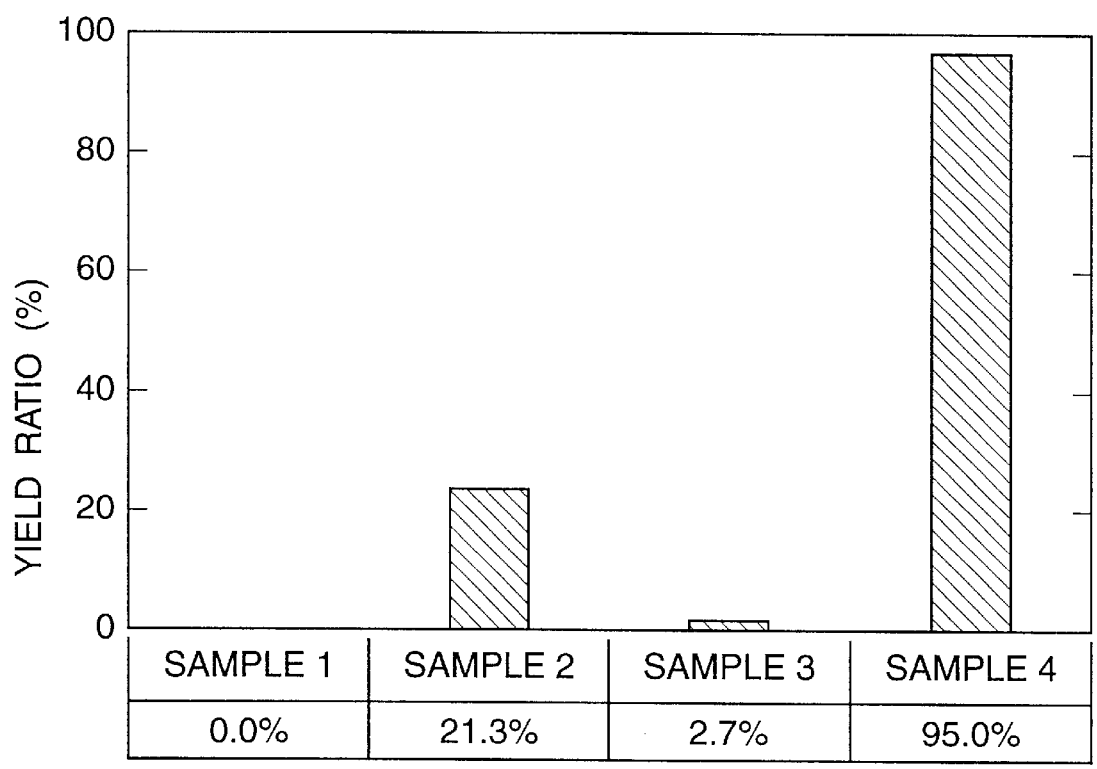
FIG. 32 is a table for showing yield ratios of the samples used in the experiment.

The inventors have been experimented for proving the effects of this invention. FIG. 30 shows a heat cycle applied to samples used in the experiment. In FIG. 30, temperature gradients were the same of 1.0° C./min, time periods T1, T3 and T4 were respectively 30 min, and time period T2 was 0 min. FIG. 31 shows a waveform of a popcorn noise observed by an oscilloscope. FIG. 32 shows yield ratios of the samples. With respect to FIG. 32, samples in which at least one popcorn noise was observed were judged defective.

Sample 1 corresponds to a predetermined number of conventional quadruple-type IR receiving elements with no U-shaped slit, in which whole of the pyroelectric substrate is uniformly polarized. Sample 2 corresponds to the predetermined number of conventional quadruple-type IR receiving elements with U-shaped slits, in which whole of the pyroelectric substrate is uniformly polarized. Sample 3 corresponds to the predetermined number of conventional quadruple-type IR receiving elements with no U-shaped slit, in which portions in a substrate corresponding to IR receiving portions are uniformly polarized, and the remainder is polarized at random. Sample 4 corresponds to the predetermined number of quadruple-type IR receiving elements in accordance with the fifth embodiment, for example, shown in FIG. 26. In the sample 4, U-shaped slits are formed for surrounding IR receiving portions. Portions in a substrate corresponding to the IR receiving portions, the terminals and the overlapped portions of the flat cables, shown in FIG. 28, are uniformly polarized. The terminals and the overlapped portions of the flat cables are short-circuited between the top surface and the bottom surface. The remainder is polarized at random. The other conditions of the samples such as sizes, conductive patterns, and mounting configurations were the same. These samples were air-tightly contained in a chamber and the temperature in the chamber was controlled to vary as shown in FIG. 30.

As can be seen from FIG. 32, the yield of the sample 4 having the characteristic configuration of this invention was remarkably increased. It was found that the combination of the U-shaped slits and the polarization pattern of the pyroelectric substrate was effective to reduce the occurrence of the popcorn noises in the pyroelectric-type IR receiving element. Especially, it is effective to apply this invention when a material of the substrate has low conductivity such as a wafer of single crystal of LiTaO$_3$. It is considered that the lower the conductivity of the material of the substrate is, the easier the undesired electric charge can be charged in the substrate.

Other Modifications

Figure 33:
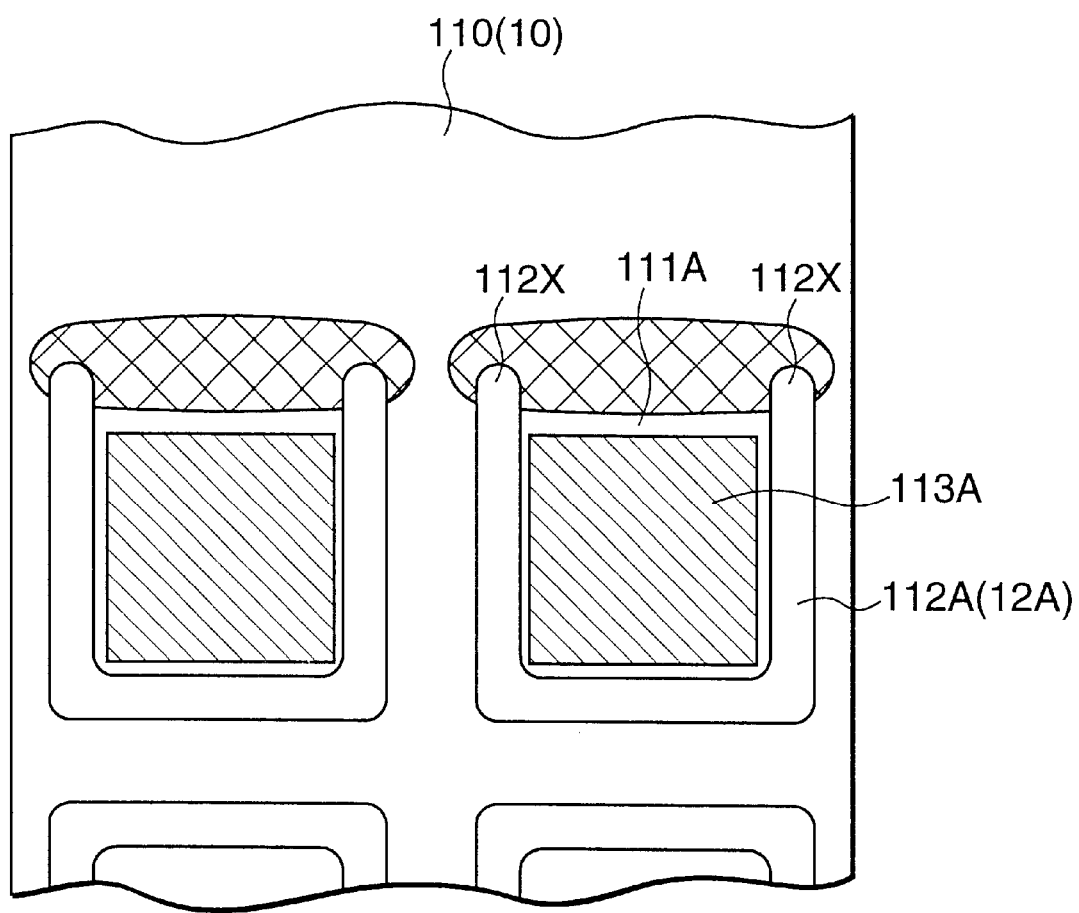
FIG. 33 is a plan view for showing a modification of the U-shaped slits in the above-mentioned embodiments.
Figure 34:
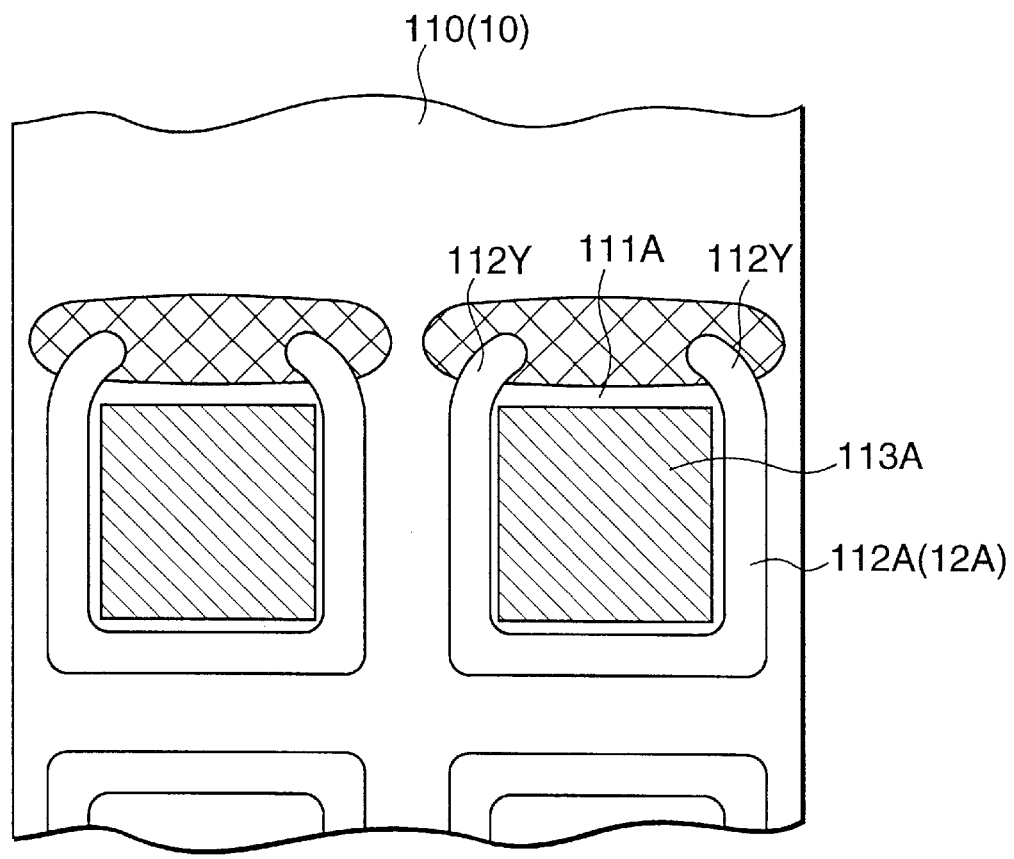
FIG. 34 is a plan view for showing another modification of the U-shaped slits in the above-mentioned embodiments.
Figure 35:
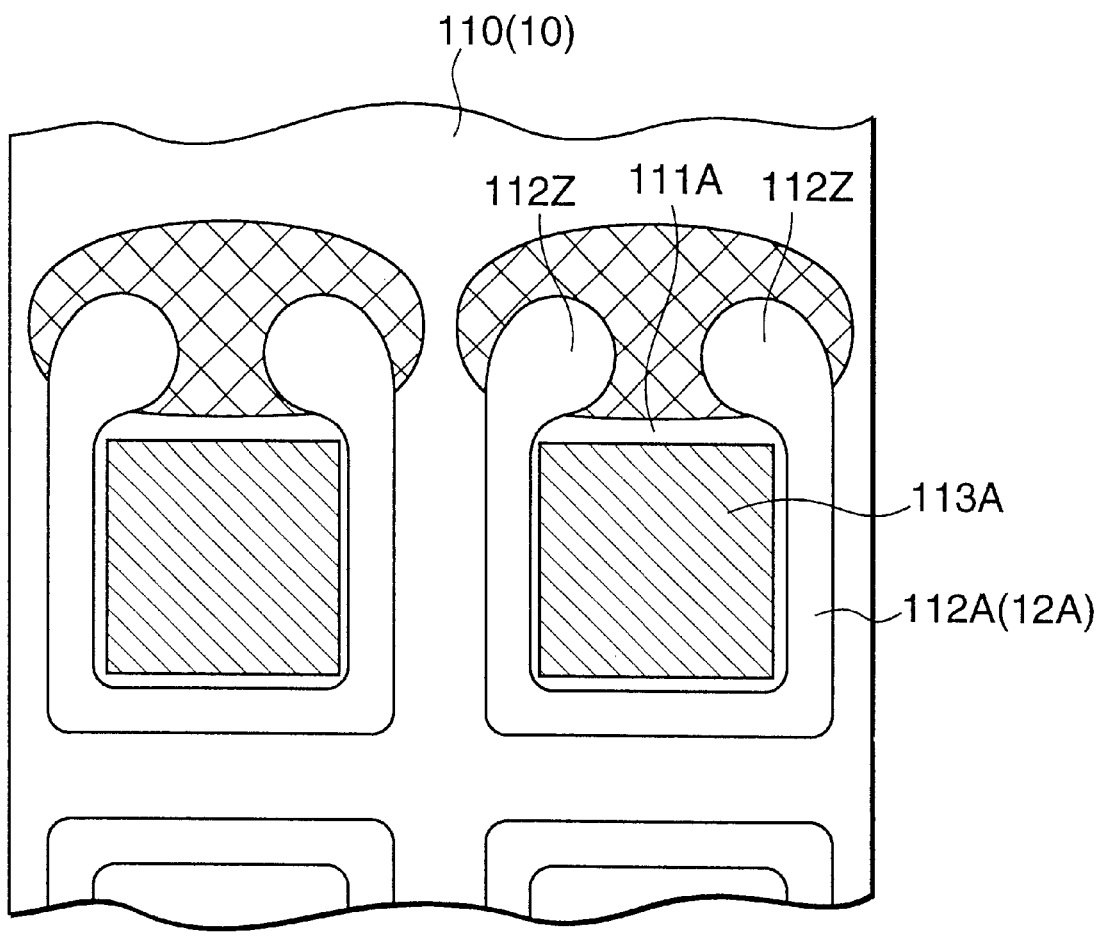
FIG. 35 is a plan view for showing still another modification of the U-shaped slits in the above-mentioned embodiments.
Figure 36:
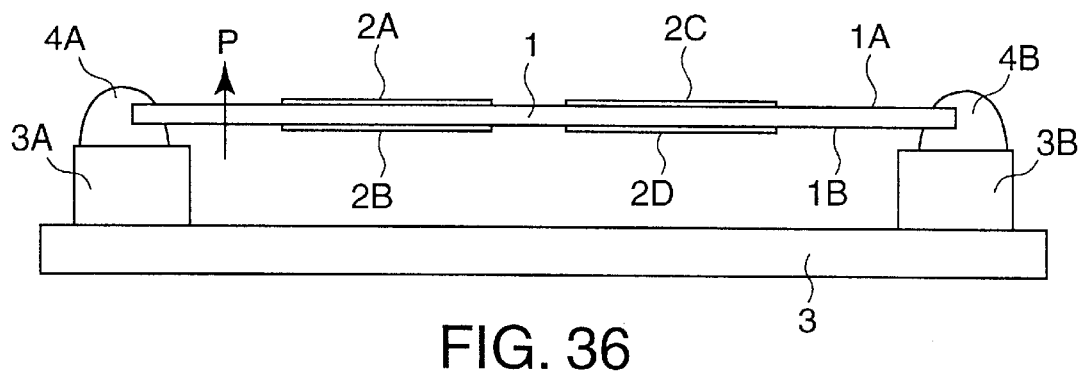
FIG. 36 is a sectional view for showing a configuration of a conventional pyroelectric-type IR receiving element.

In the above-mentioned embodiments, ends of the U-shaped slits are not described in detail. It is possible to form the ends 112X of the U-shaped slits 112A . . . (12A . . . ) to be round for reducing stress concentration, as shown in FIG. 33. Furthermore, it is possible to bend both ends 112Y of the U-shaped slits 112A . . . (12A . . . ) toward the inside of the slits, as shown in FIG. 34. Alternatively, it is possible to form round holes 112Z having a diameter larger than the slit width at both ends of the U-shaped slits 112A . . . (12A . . . ), as shown in FIG. 35. By such configurations, a stress applied to the end of the cantilever portions 111A . . . (11A . . . ) when the substrate 110 (10) is warped due to the difference of the thermal coefficients between the substrate 110 (10) and the base member on which the substrate is mounted can efficiently be absorbed by the round ends 112X, bent ends 112Y or round holes 112Z of the U-shaped slits 112A . . . (12A . . . ).

Furthermore, in the above-mentioned embodiments, the polarization of the substrate is treated with each substrate 10 or 110 after forming conductive patterns including the electrodes 13A . . . or 113A . . . and the terminals 14A . . . or 114A . . . . It, however, is possible to treat the polarization of a plurality of the substrates with conductive patterns formed on the same wafer of single crystal pyroelectric material. Each substrate 10 or 110 is cut from the wafer by dicing method, or the like.

Still furthermore, it is possible that at least in the vicinity of a cantilever end of the cantilever portion 11A . . . or 111A . . . including both ends of the U-shaped slit 12A . . . or 112A . . . shown by cross-hatched region in FIGS. 33 to 35 is polarized at random. By such configurations, it is possible to reduce the occurrence of the popcorn noises.

In the above-mentioned embodiments, it is preferable that the infrared ray sensor is a temperature sensor, a heat sensor, or a human sensor.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

This application is based on Japanese application serial No. HEI 11-360043 filed in Japan on Dec. 17, 1999, the contents of which are hereby incorporated by reference.

What is claimed is:

1. An infrared ray receiving element comprising:
   a substrate made of a pyroelectric material and having at least one cantilever portion surrounded by a slit, in which at least a part of the cantilever portion in the substrate is uniformly polarized in the same direction and the remainder in the substrate includes a portion polarized at random; and
   at least a pair of electrodes respectively provided on a top surface and a bottom surface of the cantilever portion.

2. The infrared ray receiving element in accordance with claim 1, wherein whole of the remainder in the substrate is polarized at random.

3. The infrared ray receiving element in accordance with claim 1, wherein conductive patterns connected to the electrodes are further provided on the top surface and the bottom surface of the substrate, portions in the substrate put between the conductive patterns are uniformly polarized in the same direction, and each two conductive patterns facing each other via the substrate is externally short-circuited.

4. The infrared ray receiving element in accordance with claim 3, wherein whole of the substrate is polarized at random prior to forming the electrodes, and portions in the substrate put between the electrodes and between the conductive patterns are uniformly polarized by applying a predetermined voltage between the conductive patterns.

5. The infrared ray receiving element in accordance with claim 3, wherein a plurality of cantilever portions are provided for forming a plurality of infrared ray receiving portions, and the conductive patterns are formed for connecting at least two of the infrared ray receiving portions in series.

6. The infrared ray receiving element in accordance with claim 3, wherein a plurality of cantilever portions are provided for forming a plurality of infrared ray receiving portions, and the conductive patterns are formed for connecting at least two of the infrared ray portions in parallel.

7. The infrared ray receiving element in accordance with claim 3, wherein a plurality of cantilever portions are provided symmetrically for forming a plurality of infrared ray receiving portions.

8. The infrared ray receiving element in accordance with claim 1, wherein at least in the vicinity of a cantilever end of the cantilever portion including both ends of the slit is polarized at random.

9. The infrared ray receiving element in accordance with claim 1, wherein whole of the substrate is polarized at random prior to forming the electrodes, and a portion in the substrate put between the electrodes is uniformly polarized by applying a predetermined voltage between the electrodes.

10. The infrared ray receiving element in accordance with claim 1, wherein both ends of the slit are bent toward inside of the cantilever portion.

11. The infrared ray receiving element in accordance with claim 1, wherein round holes are formed at both ends of the slit.

12. The infrared ray receiving element in accordance with claim 1, wherein the slit is a U-shaped slit surrounding three sides of rectangular cantilever portion.

13. An infrared ray sensor comprising an infrared ray receiving element, a base member for holding the infrared ray receiving element, a circuit substrate connected to the infrared ray receiving element for detecting that infrared ray reached to an infrared ray receiving portion of the infrared ray receiving element, a chassis for supporting the infrared ray receiving element, the base member, the circuit substrate, and a cover with an infrared ray transmittable window, wherein the infrared ray receiving element comprises:
   the substrate made of a pyroelectric material and having at least one cantilever portion surrounded by a slit, in which at least a part of the cantilever portion in the substrate is uniformly polarized in the same direction and the remainder in the substrate includes a portion polarized at random; and
   at least a pair of electrodes respectively provided on a top surface and a bottom surface of the cantilever portion.

14. The infrared ray sensor in accordance with claim 13, wherein whole of the remainder in the substrate is polarized at random.

15. The infrared ray sensor in accordance with claim 13, wherein conductive patterns connected to the electrodes are further provided on the top surface and the bottom surface of the substrate, portions in the substrate put between the conductive patterns are uniformly polarized in the same direction, and each two conductive patterns facing each other via the substrate is externally short-circuited.

16. The infrared ray sensor in accordance with claim 13, wherein at least in the vicinity of a cantilever end of the cantilever portion including both ends of the slit is polarized at random.

17. The infrared ray sensor in accordance with claim 13, wherein whole of the substrate is polarized at random prior to forming the electrodes, and a portion in the substrate put between the electrodes is uniformly polarized by applying a predetermined voltage between the electrodes.

18. The infrared ray sensor in accordance with claim 17, wherein whole of the substrate is polarized at random prior to forming the electrodes, and portions in the substrate put between the electrodes and the conductive patterns are uniformly polarized by applying a predetermined voltage between the conductive patterns.

* * * * *